US00RE42729E

(19) United States
(12) Reissued Patent
Kleinert

(10) Patent Number: US RE42,729 E
(45) Date of Reissued Patent: Sep. 27, 2011

(54) WORK GLOVE

(75) Inventor: James M. Kleinert, Turners Station, KY (US)

(73) Assignee: Hillerich & Bradsby Co., Louisville, KY (US)

(21) Appl. No.: 11/895,261

(22) Filed: Aug. 23, 2007

Related U.S. Patent Documents

Reissue of:
(64) Patent No.: 7,000,256
Issued: Feb. 21, 2006
Appl. No.: 10/670,859
Filed: Sep. 25, 2003

U.S. Applications:
(63) Continuation-in-part of application No. 10/001,325, filed on Oct. 25, 2001, now Pat. No. 6,701,530, which is a continuation-in-part of application No. 09/867,084, filed on May 29, 2001, now Pat. No. 6,389,601, which is a continuation of application No. 09/491,742, filed on Jan. 27, 2000, now Pat. No. 6,253,382.

(51) Int. Cl.
*A41D 19/00* (2006.01)
(52) U.S. Cl. ..... 2/159; 2/16
(58) Field of Classification Search ..... 2/16, 19, 2/20, 159, 161.1, 161.2, 161.6, 163
See application file for complete search history.

(56) References Cited

U.S. PATENT DOCUMENTS

| | | | | |
|---|---|---|---|---|
| 325,968 | A * | 9/1885 | Rawlings | 2/19 |
| 385,728 | A | 7/1888 | Sauer | |
| RE12,996 | E | 7/1909 | Peach | |
| 1,018,271 | A | 2/1912 | Rogers | |
| 1,202,705 | A | 10/1916 | Goldsmith et al. | |
| 1,435,478 | A | 11/1922 | Kennedy | |
| 1,436,131 | A | 11/1922 | Whitley | |
| 1,496,824 | A | 6/1924 | Nixon, Jr. | |
| 1,525,298 | A | 2/1925 | Hartman | |

(Continued)

FOREIGN PATENT DOCUMENTS

GB 710394 6/1954

(Continued)

OTHER PUBLICATIONS

Knecht, Petra: "Funktionstextilien" 2003, Deutscher Fachverlag GmbH, Frankfurt Am Main, XP002473095, pp. 62, 63 and pp. 282, 283.

(Continued)

*Primary Examiner* — Katherine Moran
(74) *Attorney, Agent, or Firm* — James E. Cole; Charles G. Lamb; Middleton Reutlinger

(57) ABSTRACT

A work glove particularly useful for gardening, automobile mechanical work and any other type of use which brings the palmar side of the hand in contact with work or the like which may result in stinging, bruising, or blistering of the fingers, thumb and palm of a human hand is provided with protective padding disclosed or positioned for overlying at least the distal halves of the index finger and long finger metacarpals excluding the metacarpalphalangeal joints of the index finger and the long finger. Preferably, the glove also includes protective padding disposed along a thumb stall of the glove at a location adapted to be along an ulnar border as well as the A2 pulleys of the thumb's proximal phalanx between the metacarpalphalangeal joint and the interphalangeal joint.

8 Claims, 14 Drawing Sheets

U.S. PATENT DOCUMENTS

| | | | | | |
|---|---|---|---|---|---|
| 1,552,080 | A | | 9/1925 | Rainey | |
| 1,562,176 | A | | 11/1925 | Latina | |
| RE16,272 | E | | 2/1926 | Green | |
| 1,594,304 | A | | 7/1926 | Klahn et al. | |
| D72,069 | S | | 2/1927 | Meyers | |
| 1,716,221 | A | | 6/1929 | Fernie | |
| 1,841,193 | A | | 1/1932 | Lidston | |
| 1,900,395 | A | | 3/1933 | Gitt | |
| 2,083,935 | A | * | 6/1937 | Arnold | 2/161.6 |
| 2,258,999 | A | | 10/1941 | Nunn | |
| 2,344,080 | A | | 3/1944 | Burgett | |
| 2,369,115 | A | | 2/1945 | Bloom | |
| 2,465,136 | A | | 3/1949 | Troccoli | |
| 2,528,802 | A | | 11/1950 | Turner | |
| 2,558,544 | A | | 6/1951 | Delsalle | |
| 2,636,172 | A | | 4/1953 | Stobbe | |
| 2,750,594 | A | | 6/1956 | Denkert | |
| 2,975,429 | A | | 3/1961 | Newman | |
| 2,980,915 | A | | 4/1961 | Peterson | |
| 3,042,929 | A | | 7/1962 | Kobos | |
| 3,096,523 | A | | 7/1963 | Bruchas | |
| 3,164,841 | A | | 1/1965 | Burtoff | |
| 3,175,226 | A | | 3/1965 | Weinberg | |
| 3,273,165 | A | | 9/1966 | Sperandeo | |
| 3,290,695 | A | | 12/1966 | Burtoff | |
| 3,300,787 | A | | 1/1967 | Denkert | |
| 3,411,222 | A | | 11/1968 | Williams | |
| D213,287 | S | | 2/1969 | Khazzam | |
| 3,458,867 | A | | 8/1969 | Moore et al. | |
| 3,532,344 | A | | 10/1970 | Masstab | |
| 3,564,613 | A | | 2/1971 | Fowler | |
| 3,576,036 | A | | 4/1971 | Latina | |
| 3,588,915 | A | | 6/1971 | Latina | |
| 3,605,117 | A | | 9/1971 | Latina | |
| 3,606,614 | A | | 9/1971 | Dimitroff | |
| 3,649,966 | A | | 3/1972 | Shields | |
| 3,707,730 | A | | 1/1973 | Slider | |
| 3,918,096 | A | | 11/1975 | Lim | |
| D240,671 | S | | 7/1976 | McTear | |
| D240,672 | S | | 7/1976 | McTear | |
| 3,997,922 | A | | 12/1976 | Huhta | |
| 3,997,992 | A | | 12/1976 | Anderson | |
| 4,027,339 | A | | 6/1977 | Brucker | |
| 4,038,787 | A | | 8/1977 | Bianchi | |
| 4,042,975 | A | | 8/1977 | Elliott, Jr. et al. | |
| 4,051,552 | A | | 10/1977 | Widdemer | |
| 4,051,553 | A | | 10/1977 | Howard | |
| 4,067,063 | A | | 1/1978 | Ettinger | |
| 4,068,312 | A | | 1/1978 | Ledesma | |
| 4,084,584 | A | | 4/1978 | Detty | |
| 4,095,292 | A | | 6/1978 | Klein | |
| D248,898 | S | | 8/1978 | DeLeone et al. | |
| 4,137,572 | A | | 2/1979 | Jansson et al. | |
| 4,187,557 | A | | 2/1980 | Tombari | |
| 4,201,203 | A | | 5/1980 | Applegate | |
| 4,250,578 | A | | 2/1981 | Barlow | |
| 4,272,849 | A | | 6/1981 | Thurston et al. | |
| 4,272,850 | A | | 6/1981 | Rule | |
| 4,287,885 | A | | 9/1981 | Applegate | |
| 4,329,741 | A | | 5/1982 | Bach | |
| 4,346,481 | A | | 8/1982 | Latina | |
| 4,438,532 | A | | 3/1984 | Campanella et al. | |
| 4,445,507 | A | | 5/1984 | Eisenberg | |
| 4,524,464 | A | | 6/1985 | Primiano et al. | |
| 4,546,495 | A | | 10/1985 | Castillo | |
| 4,561,122 | A | | 12/1985 | Stanley et al. | |
| 4,570,269 | A | | 2/1986 | Berlese | |
| 4,589,146 | A | | 5/1986 | Taylor | |
| 4,590,625 | A | | 5/1986 | Keim | |
| 4,630,318 | A | | 12/1986 | Aoki | |
| 4,663,783 | A | | 5/1987 | Obayashi | |
| 4,665,561 | A | | 5/1987 | Aoki | |
| 4,677,698 | A | | 7/1987 | Angas | |
| 4,684,123 | A | | 8/1987 | Fabry | |
| 4,691,387 | A | | 9/1987 | Lopez | |
| 4,700,404 | A | * | 10/1987 | Potvin | 2/16 |
| D294,984 | S | | 3/1988 | Green | |
| 4,747,163 | A | * | 5/1988 | Dzierson | 2/161.1 |
| 4,748,690 | A | * | 6/1988 | Webster | 2/161.1 |
| 4,751,749 | A | | 6/1988 | Cowhey | |
| 4,766,612 | A | | 8/1988 | Patton, Sr. | |
| 4,815,147 | A | | 3/1989 | Gazzano et al. | |
| 4,847,915 | A | | 7/1989 | Keene | |
| 4,850,053 | A | | 7/1989 | Tepley et al. | |
| 4,864,659 | A | | 9/1989 | Morris | |
| 4,864,660 | A | | 9/1989 | Sawyer | |
| 4,891,845 | A | | 1/1990 | Hayes | |
| 4,896,376 | A | | 1/1990 | Miner | |
| 4,911,433 | A | | 3/1990 | Walker et al. | |
| 4,930,162 | A | | 6/1990 | Côté | |
| 4,958,384 | A | | 9/1990 | McCrane | |
| 4,967,418 | A | | 11/1990 | Marcotte | |
| 5,004,227 | A | | 4/1991 | Hoffman | |
| 5,016,286 | A | | 5/1991 | Henriksen | |
| 5,028,050 | A | | 7/1991 | Freyer | |
| 5,031,238 | A | | 7/1991 | Hayes | |
| 5,058,209 | A | | 10/1991 | Eisenberg | |
| 5,067,175 | A | * | 11/1991 | Gold | 2/16 |
| 5,083,361 | A | | 1/1992 | Rudy | |
| 5,107,544 | A | * | 4/1992 | Capatosto | 2/16 |
| D328,369 | S | | 7/1992 | Hong | |
| 5,136,725 | A | | 8/1992 | Montero | |
| 5,146,624 | A | | 9/1992 | Brückner | |
| 5,168,576 | A | | 12/1992 | Krent et al. | |
| 5,168,578 | A | | 12/1992 | Stanley | |
| D332,845 | S | | 1/1993 | Johnston | |
| 5,175,886 | A | | 1/1993 | Suk | |
| 5,195,188 | A | | 3/1993 | Bourdeau et al. | |
| 5,214,799 | A | * | 6/1993 | Fabry | 2/161.6 |
| 5,218,718 | A | | 6/1993 | Chih | |
| 5,218,719 | A | | 6/1993 | Johnson | |
| D338,280 | S | | 8/1993 | Krent et al. | |
| 5,237,703 | A | | 8/1993 | Brine et al. | |
| 5,253,365 | A | | 10/1993 | Clevenhagen | |
| 5,257,418 | A | | 11/1993 | Jaskiewicz | |
| 5,309,573 | A | | 5/1994 | Solar et al. | |
| 5,323,490 | A | | 6/1994 | Yarbrough | |
| 5,328,652 | A | | 7/1994 | Thomson | |
| 5,329,639 | A | | 7/1994 | Aoki | |
| 5,330,391 | A | | 7/1994 | Mitchell | |
| 5,345,609 | A | | 9/1994 | Fabry et al. | |
| 5,379,460 | A | | 1/1995 | Aoki | |
| D356,203 | S | | 3/1995 | Mitch | |
| D360,284 | S | | 7/1995 | Paffett et al. | |
| 5,435,008 | A | | 7/1995 | Shane | |
| 5,442,815 | A | | 8/1995 | Cordova et al. | |
| 5,442,816 | A | | 8/1995 | Seketa | |
| 5,459,878 | A | | 10/1995 | Gold | |
| 5,462,280 | A | | 10/1995 | Dickerson | |
| 5,471,682 | A | | 12/1995 | Robins et al. | |
| 5,477,558 | A | | 12/1995 | Völker et al. | |
| 5,488,739 | A | | 2/1996 | Cardinal | |
| 5,490,290 | A | * | 2/1996 | Gold | 2/159 |
| 5,500,955 | A | | 3/1996 | Gongea | |
| 5,511,242 | A | | 4/1996 | Bianchi | |
| 5,511,243 | A | | 4/1996 | Hall et al. | |
| 5,511,244 | A | | 4/1996 | Shikatani | |
| 5,530,967 | A | * | 7/1996 | Cielo | 2/16 |
| 5,551,083 | A | | 9/1996 | Goldsmith | |
| 5,557,803 | A | | 9/1996 | Granich et al. | |
| 5,564,122 | A | * | 10/1996 | Wagner | 2/16 |
| 5,575,005 | A | | 11/1996 | Walker et al. | |
| 5,581,809 | A | * | 12/1996 | Mah | 2/20 |
| 5,592,688 | A | | 1/1997 | LaRonge et al. | |
| 5,598,582 | A | | 2/1997 | Andrews et al. | |
| 5,600,853 | A | * | 2/1997 | Yewer, Jr. | 2/161.1 |
| 5,608,912 | A | | 3/1997 | Cumberland | |
| 5,608,915 | A | | 3/1997 | Libit | |
| 5,634,214 | A | | 6/1997 | St. Ville | |
| 5,638,548 | A | | 6/1997 | Kawakami | |
| 5,640,712 | A | * | 6/1997 | Hansen et al. | 2/20 |
| 5,644,795 | A | | 7/1997 | Landis et al. | |
| 5,655,221 | A | * | 8/1997 | Worischeck | 2/16 |
| 5,655,226 | A | | 8/1997 | Williams | |
| 5,659,897 | A | | 8/1997 | Satoh | |
| D385,667 | S | * | 10/1997 | Goldsmith | D29/116.3 |
| 5,675,839 | A | * | 10/1997 | Gordon et al. | 2/159 |

5,678,245 A 10/1997 Rector et al.
5,682,613 A 11/1997 Dinatale
5,685,014 A 11/1997 Dapsalmon
5,692,242 A 12/1997 Tekerman et al.
5,694,642 A 12/1997 Rector et al.
5,697,103 A 12/1997 Wiggins
5,697,104 A 12/1997 Welton
D389,283 S 1/1998 Goldsmith et al.
5,708,979 A 1/1998 Redwood et al.
5,715,539 A 2/1998 Benecki et al.
5,717,994 A 2/1998 Goldsmith
5,717,995 A 2/1998 Murai
5,720,047 A 2/1998 Spitzer
5,745,916 A 5/1998 Linner
5,761,745 A 6/1998 Sato
5,781,929 A 7/1998 Shikatani
5,781,931 A 7/1998 Lee
5,785,617 A 7/1998 MacKay, Jr.
5,787,506 A 8/1998 Wilder et al.
5,790,980 A * 8/1998 Yewer, Jr. ..... 2/20
5,799,327 A 9/1998 Clevenhagen
5,802,614 A 9/1998 Melone, Jr.
5,806,092 A 9/1998 Shikatani
5,809,571 A 9/1998 Spitzer
5,815,839 A 10/1998 Safford
5,815,840 A 10/1998 Hamlin
5,819,312 A 10/1998 Snyder et al.
5,855,022 A 1/1999 Storto
5,878,436 A 3/1999 Jones
5,884,329 A 3/1999 Goldsmith et al.
5,887,282 A 3/1999 Lenhart
5,893,172 A 4/1999 Haynes et al.
5,898,938 A 5/1999 Baylor et al.
5,898,942 A 5/1999 Anderson
5,926,847 A 7/1999 Eibert
5,946,720 A 9/1999 Sauriol
5,963,985 A 10/1999 Behr et al.
5,983,396 A 11/1999 Morrow et al.
5,987,642 A 11/1999 Webster
5,987,646 A 11/1999 Bolmer
D417,757 S 12/1999 Aoki
5,996,117 A 12/1999 Goldsmith et al.
6,000,059 A 12/1999 Abts
6,006,751 A 12/1999 Spitzer
6,012,170 A 1/2000 Kim
6,016,571 A 1/2000 Guzman et al.
D420,173 S 2/2000 Aoki
D420,174 S 2/2000 Aoki
D420,202 S 2/2000 Redwood et al.
6,035,443 A 3/2000 Green
6,041,438 A 3/2000 Kirkwood
6,049,910 A 4/2000 McCarter
6,052,827 A 4/2000 Widdemer
6,065,150 A 5/2000 Huang
D426,922 S 6/2000 Redwood et al.
6,085,352 A * 7/2000 Martin ..... 2/16
6,088,835 A 7/2000 Perkins et al.
6,098,200 A 8/2000 Minkow et al.
6,105,162 A 8/2000 Douglas et al.
6,122,769 A 9/2000 Wilder et al.
D431,691 S 10/2000 Redwood et al.
6,182,289 B1 2/2001 Brown
6,185,747 B1 2/2001 Hughes
6,216,276 B1 4/2001 Eibert
6,223,350 B1 5/2001 McFarlane
6,223,744 B1 5/2001 Garon
6,226,795 B1 5/2001 Winningham
6,233,744 B1 5/2001 McDuff
6,249,915 B1 6/2001 Hang
6,253,382 B1 * 7/2001 Kleinert ..... 2/161.1
6,256,792 B1 7/2001 MacDonald
D445,996 S 8/2001 Kiernan
6,275,996 B1 8/2001 Redwood et al.
6,279,160 B1 8/2001 Chen
6,279,163 B1 8/2001 Hale et al.
6,289,515 B1 9/2001 Fous
6,289,516 B1 9/2001 Motooka et al.
6,321,387 B1 11/2001 Fukae
6,353,931 B1 3/2002 Gilligan et al.
6,378,925 B1 4/2002 Greenlee
6,389,601 B2 5/2002 Kleinert
6,405,380 B1 6/2002 Kuroda et al.
6,415,444 B1 * 7/2002 Kleinert ..... 2/161.1
6,415,445 B1 7/2002 Nishijima et al.
D461,621 S 8/2002 Bevier
6,427,247 B1 8/2002 Suk
6,430,745 B2 8/2002 Murai
D462,922 S 9/2002 Yuan et al.
6,453,474 B2 * 9/2002 Kleinert ..... 2/161.1
D464,178 S 10/2002 Redwood et al.
6,460,184 B1 10/2002 Nishimura et al.
6,487,724 B1 12/2002 Aoki
D468,075 S 1/2003 Votel
6,502,244 B1 * 1/2003 Kleinert ..... 2/163
6,516,470 B1 2/2003 Aoki
6,516,471 B1 2/2003 Baumann
6,519,781 B1 2/2003 Berns
D471,343 S 3/2003 Sun
D471,674 S 3/2003 Redwood et al.
6,526,592 B1 3/2003 Best
6,536,046 B1 3/2003 Gilligan
D474,863 S 5/2003 Sun
D474,963 S 5/2003 Gersten et al.
6,571,394 B1 6/2003 Hackett et al.
6,584,616 B2 7/2003 Godshaw et al.
6,618,860 B1 9/2003 Sullivan et al.
6,651,255 B1 11/2003 Schild
6,662,942 B1 12/2003 Bonzagni
6,668,379 B2 12/2003 Kleinert
6,681,402 B1 1/2004 Bevier et al.
6,701,530 B2 3/2004 Kleinert
6,704,939 B2 3/2004 Faulconer
6,708,346 B2 3/2004 Terris et al.
6,715,152 B2 4/2004 Mazzarolo
6,721,960 B1 4/2004 Levesque et al.
6,732,377 B1 5/2004 Wilkinson
6,745,402 B2 6/2004 Caswell
6,760,923 B1 7/2004 Tate
6,760,924 B2 7/2004 Hatch et al.
D495,097 S 8/2004 Redwood et al.
6,775,847 B2 8/2004 Terris et al.
D499,529 S 12/2004 Kleinert
D499,856 S 12/2004 Kleinert
6,845,514 B1 1/2005 Yao
6,845,519 B2 1/2005 Garneau
6,862,744 B2 3/2005 Kuroda et al.
6,961,960 B2 * 11/2005 Gold et al. ..... 2/20
D513,828 S 1/2006 Bevier
D514,772 S 2/2006 Bevier
7,000,256 B2 * 2/2006 Kleinert ..... 2/159
7,000,257 B2 2/2006 Bevier
D516,277 S 3/2006 Mattesky
D529,236 S 9/2006 Litke et al.
7,100,212 B2 9/2006 Jaeger
D532,162 S 11/2006 Bonzagni et al.
7,171,696 B2 2/2007 Falone et al.
D545,002 S 6/2007 Voravan
D549,398 S 8/2007 Swartz et al.
D554,808 S 11/2007 Litke et al.
D570,056 S 5/2008 Metcalf
7,406,719 B2 8/2008 Aoki
D583,527 S 12/2008 Kleinert
D583,528 S 12/2008 Kleinert
7,464,446 B2 12/2008 Johansson
D584,026 S 1/2009 Kleinert
7,578,006 B2 8/2009 Garneau
7,707,653 B2 5/2010 Kleinert
2001/0025382 A1 10/2001 Murai
2001/0054190 A1 12/2001 Kleinert
2002/0013961 A1 2/2002 Kleinert
2002/0040494 A1 4/2002 Kleinert
2002/0042940 A1 4/2002 Kuroda et al.
2002/0152536 A1 10/2002 Kuroda et al.
2003/0005506 A1 1/2003 Like
2003/0050586 A1 3/2003 Domanski et al.
2003/0051285 A1 3/2003 Bower
2003/0056273 A1 3/2003 Kleinert
2003/0061651 A1 4/2003 DeRose, Sr.

| | | | |
|---|---|---|---|
| 2003/0205232 | A1 | 11/2003 | Spitzer |
| 2004/0016038 | A1 | 1/2004 | Motooka et al. |
| 2004/0025226 | A1 | 2/2004 | Jaeger |
| 2004/0025227 | A1 | 2/2004 | Jaeger |
| 2004/0103465 | A1 | 6/2004 | Kleinert |
| 2004/0107476 | A1 | 6/2004 | Goldwitz |
| 2004/0111786 | A1 | 6/2004 | Terris et al. |
| 2004/0123371 | A1 | 7/2004 | Bryant, Sr. |
| 2004/0216207 | A1 | 11/2004 | Anderson |
| 2004/0221365 | A1 | 11/2004 | Fitzgerald |
| 2005/0034213 | A1 | 2/2005 | Bamber |
| 2005/0114982 | A1 | 6/2005 | Gremmert |
| 2006/0026738 | A1 | 2/2006 | Kleinert |
| 2006/0137067 | A1 | 6/2006 | Wu |
| 2006/0195968 | A1 | 9/2006 | Powell et al. |
| 2007/0061943 | A1 | 3/2007 | Kleinert |
| 2007/0150998 | A1 | 7/2007 | Atherton |
| 2007/0150999 | A1 | 7/2007 | Brown |
| 2007/0209097 | A1 | 9/2007 | Iacullo |
| 2008/0052799 | A1 | 3/2008 | Yoo |
| 2008/0060115 | A1 | 3/2008 | Morris |
| 2008/0141435 | A1 | 6/2008 | Friedman |
| 2009/0139010 | A1 | 6/2009 | Bevier |

FOREIGN PATENT DOCUMENTS

| | | | |
|---|---|---|---|
| JP | 401171849 | | 7/1989 |
| JP | 09182825 | | 7/1997 |
| JP | 02003020504 | | 1/2003 |
| WO | 9716085 | A1 | 5/1997 |
| WO | WO-03082036 | | 10/2003 |

OTHER PUBLICATIONS

Anonymous: "Sportco Source" Internet Article, [Online] Apr. 27, 2006, XP002473014, Retrieved from the Internet: URL: http://web.archive.org/web/20060427131931/http://www.sportcoint.com/baseballgloves.htm> [retrieved on Mar. 17, 2008], p. 9.

Anonymous: "The Coolmax Golf Glove", Internet Article, [Online] Aug. 29, 2006, XP002473015, Retrieved from the Internet: URL: http://web.archive.org/web/20060829123241/http://www.hsc.csu.edu.au/ textiles__design/performance/2795/glove.htm> [retrieved on Mar. 17, 2008] the whole document.

European Patent Office (ISA/EP); International Search Report and Written Opinion of the International Searching Authority, or the Declaration; Apr. 10, 2008; pp. 1-20; PCT/US2007/023054; European Patent Office; the Netherlands.

United States Patent and Trademark Office (ISA/US); International Search Report and Written Opinion of the International Searching Authority, or the Declaration; May 9, 2005; pp. 1-8; PCT/US04/31316; U.S. Patent and Trademark Office; USA.

European Patent Office (ISA/EP); International Search Report and Written Opinion of the International Searching Authority, or the Declaration; Apr. 13, 2007; pp. 1-8; PCT/US2006/038290; European Patent Office; the Netherlands.

European Patent Office (ISA/EP); International Search Report and Written Opinion of the International Searching Authority, or the Declaration; Jan. 23, 2008; pp. 1-12; PCT/US2007/017302; European Patent Office; the Netherlands.

United States Patent and Trademark Office (ISA/US); International Search Report of the International Searching Authority; Jul. 17, 2003; pp. 1-5; PCT/US03/09409; U.S. Patent and Trademark Office; USA.

European Patent Office (ISA/EP); International Search Report; Jun. 22, 2001; pp. 1-3; PCT/US2001/02608; European Patent Office; the Netherlands.

United States Patent and Trademark Office (ISA/US); International Search Report of the International Searching Authority; Apr. 23, 2003; pp. 1-3; PCT/US02/19390; U.S. Patent and Trademark Office; USA.

United States Patent and Trademark Office (ISA/US); International Search Report of the International Searching Authority; Apr. 7, 2005; pp. 1-3; PCT/US03/41488; U.S. Patent and Trademark Office; USA.

* cited by examiner

WORK GLOVE

Matter enclosed in heavy brackets [ ] appears in the original patent but forms no part of this reissue specification; matter printed in italics indicates the additions made by reissue.

CROSS REFERENCE TO RELATED APPLICATIONS

This application is a continuation-in-part of and claims priority to and benefit from, currently U.S. patent application Ser. No. 10/001,325 filed Oct. 25, 2001 now U.S. Pat. No. 6,701,530, which is a continuation-in-part of and claims priority to and benefit from U.S. patent application Ser. No. 09/867,084 filed May 29, 2001, now U.S. Pat. No. 6,389,601 issued on May 21, 2002, which is a continuation of and claims priority to and benefit from U.S. patent application Ser. No. 09/491,742 filed Jan. 27, 2000 now U.S. Pat. No. 6,253,382 issued on Jul. 3, 2001.

BACKGROUND OF THE INVENTION

1. Field of the Invention

This invention relates to gloves for the human hand which are worn when playing sports such as baseball, softball, or working and the like. In one aspect, this invention relates to a batting glove specifically designed to improve grip, comfort, protection, and performance of a wearer. However, this invention has broader implications and may be advantageously employed in other applications requiring protection of the hands. More particularly, this invention relates to a work glove which includes padding in selected areas to provide protection of the hand during use by the wearer.

2. Description of Related Art

Glove construction for protection of the human hand is well known. In addition, there are a number of patents which teach gloves claimed to be particularly useful as batting gloves. For example, U.S. Pat. No. 3,175,226 teaches a dress glove construction which completely covers the fingers and which includes resiliently expandable materials in selected areas to accommodate hands of different sizes. In contrast, U.S. Pat. No. 4,561,122 teaches a protective glove which has a wrap around construction for a protective glove which leaves the thumb and fingers ends exposed. U.S. Pat. No. 5,345,609 teaches a protective glove which includes shock absorbing cells disposed at selected portions along the top of the glove. U.S. Pat. No. 5,790,980 teaches a hand glove with a polyurethane foam pad in the palm portion of the glove. Other references attempt to provide a sport glove for supporting and stabilizing the wrist and hand. Current gloves protect the bony prominence areas of the hand. Although hand protection from direct shocks and abrasions is found in gloves of the current art, what is needed is a batting glove which provides improved grip, comfort and performance by unloading bony prominences, unloading pulleys and tendons, and improving finger and knuckle motion of the hand of a wearer by providing preselected thicknesses of preselected materials specifically chosen to protect the wearer from injury from distributed shocks in hitting a ball with a bat, and the attendant risk of long-term injury to the aforementioned bones, ligaments, pulleys, tendons, etc., by repetitive swinging of bats and hitting of balls.

Also, hockey goaltender's blocker gloves for use, particularly in ice hockey and other sports which require the player to protect his arm from high flying objects, such as pucks or the like are well known. These blocker gloves are provided on the back or dorsal side of the hand with a blocker pad, usually of substantially rectangular shape which extends longitudinally of the glove covering the back of the hand as well as the forearm. These blocker pads are designed to control the reflective direction of a hockey puck which is directed towards the goal wherein the goaltender prevents the puck from entering the goal. The blocker pad generally has a thick leather skin at the facing thereof and has thereunder a plurality of layers of padding material. On the palmar side of the blocker glove is a stick glove portion designed to receive the thumb and fingers of the hand and to grip a hockey stick. However, there have been problems in the design of the palmar side of the blocker glove in providing protection against "stingers" and yet maintain flexibility of the fingers and rotational movement of the joints.

SUMMARY OF THE INVENTION

In the development of gloves, several key elements are utilized in the design. First, on the dorsal side of the glove, the motion zones are determined by the center axis of rotation of the individual thumb, finger, hand, and wrist joints. These motion zones have been applied to specific joint locations for the particular uses of a designed glove. This helps the flexibility of the glove in relationship to its use. As such, the motion zones are selected in various combinations or even individually depending on the specific task or function of the glove.

Secondly, on the palm side of the glove there are additional motion zones. Again, these motion zones, which also function to decrease glove impedance and improve the breath-ability of the glove, are located specifically in relationship to the center axis of rotation of the finger joints.

Thirdly, again on the palm side of the glove, there are specific areas of padding. The location of the padding is determined by the bone and joint anatomy of the hand, fingers, and thumb. For the hand, the palm pad is placed above the center axis of rotation of the wrist (i.e., just above or distal to the hook of the hamate) and just below the center axis of rotation of the metacarpal heads. These bony landmarks are actually quite prominent in relationship to the surface of the hand. By placing the pads between the bony prominences, these areas of the hand are unloaded. The type of pad chosen for the palm is specific to its function. Other applications require some adjustments to the pad, but the basic premise still remains to unload the bony prominences of the hand in relationship to the required object to be held.

The pads for the fingers are placed again between the bony prominences of each specific finger bone (phalanx). The individual pads of the digits are placed over the relatively flat portion of the phalanx and as such, between the joints that are present on each side of the respective phalanx. The pad does not cover the area near the center axis of rotation. Again, this unloads these bony areas and leads to more even distribution of force across the digit. In other words, decreased areas of concentrated pressure, i.e., over the bony prominences and individual phalanxes will experience less discomfort. Of course, improved comfort leads to better grip and performance of the specific task in question. The pads on the fingers are placed over the proximal and middle phalanx of each digit. Because of the relative bony and flexor tendon pulley anatomy, these regions correlate with the A2 and A4 pulleys specifically. Furthermore, this placement allows for unrestricted motion of the various finger and hand joints by precisely keeping the pads away from the center axis of rotation (for each specific joint). Depending on the use of the glove, various combinations, or even independent use of these pads could be utilized in glove construction. Additionally, the pads may have different sizes and shapes depending on the application. However, the pads would still be centered primarily between the bony prominences and away from the center axis of rotation for each joint.

The pad for the thumb is placed between the bony prominences of the first phalanx, primarily on the lateral (side) region. Again, the pad is located above the center axis of rotation of the metacarpalphalangeal joint of the thumb and below the center axis of rotation of the interphalangeal joint of the thumb. Other applications to this pad placement are quite numerous. Even this pad could be an application in combination with all, some, one, or none of the finger and palm pads depending on the task.

Optionally, pads may also be placed over the distal phalanx of each digit, just beyond the bony prominences. This pad would be above (distal) the center axis of rotation of the distal interphalangeal joint of the respective finger. As such, three pads could be placed over each finger depending on the use required for the glove.

The motion zone for the wrist area is also determined by the center axis of rotation of the wrist joint. This allows for essentially full motion of the wrist, while at the same time, avoiding dislodgement of the glove from the player's hand. Not all gloves require or benefit from a wrist motion zone. However, a combination of the finger, thumb, hand, and wrist motion zones determined by the joints center axis of rotation may be utilized for various glove applications.

An object of the present invention is to provide a batting glove which takes stress off of selected parts of the human hand.

Another object of the present invention is to provide a batting glove having preselected materials of construction in different areas of contact with the human hand.

A further object of the present invention is to provide a batting glove having preselected thicknesses of preselected materials of construction in different areas of contact with the human hand.

Yet another object of the present invention is to provide a batting glove which uses different materials to allow wrist motion, unload bony prominences, improve finger and knuckle motion, and protect the back of the hand.

Also, an object of the present invention is to provide a goaltender's blocker glove which takes stress off selected parts of the human hand when the glove is in use.

Another object of the present invention is to provide a hockey goaltender's blocker glove with padding added at selected areas of the hand for protecting selected anatomical portions of the human hand and yet allow the fingers and the joints of the hand to have flexibility and mobility.

Even a further object of the present invention is to provide a work glove with padding added at selected areas of the hand for protecting selected anatomical portions of the human hand and yet allow the finger and joints of the hand to have flexibility and mobility. As used herein the word "work glove" applies to, but is not limited to, for example, gloves for gardening, automobile mechanic gloves, sports glove for use when riding bicycles, motorcycles, automobile racing and the like.

In one aspect, the present invention provides a batting glove including preselected material in preselected thicknesses to fill in the soft spots surrounding the bony prominences of the hand, to unload the pulleys and tendons, and to take stress off of selected parts of the hand. Specifically, 2-Way SPANDEX® materials are used in the wrist motion zone of the glove; thin elastic material such as LYCRA® is used in the area of the finger joints and knuckles; synthetic material such as JANEC SUPER® is used in the area of the dorsal side of the fingers; a cabretta skin protective covering is used for selected parts of the hand, rubber foam protective padding is placed at selected contact areas, and soft padding such as terry cotton is placed inside the glove in selected areas.

More particularly, the present invention provides a hockey goaltender's block glove which includes a glove segment and a blocker pad. The glove segment has a dorsal side and a palmar side with a top glove panel covering the palmar side of the human hand which includes the palm, thumb and fingers and a bottom glove panel sized to cover the back, thumb and fingers of the dorsal side of the human hand. The top and bottom panels which make up the glove segment are secured along each panel's periphery to define a glove body with an opening therein to receive a human hand. The blocker pad is provided with a front face and an opposed back wherein the dorsal side of the glove segment is attached to the blocker pad back. Particularly, the glove segment is provided with a thumb and fingers section for receiving a thumb and fingers of the human hand. Shock absorbing pads are provided to overlie selected areas defined by the location of anatomical parts of the human hand when inserted into the glove. Specifically, the shock absorbing padding, which is usually a foam rubber or another foam elastomeric material of approximately ¼" in thickness, overlies at least the A2 pulley region of the thumb which is between the metacarpalphalangeal joint and the center axis of rotation of the interphalangeal joint of the thumb. Other areas of shock absorbing padding may be added to overlie the middle phalanx of the index finger above the proximal interphalangeal joint and below the center axis of rotation of the distal interphalangeal joint, to overlie the proximal phalanx of the long finger above the metacarpalphalangeal joint and below the center axis of rotation of the proximal interphalangeal joint, as well as overlying the proximal phalanx of the ring finger and the small finger above the metacarpalphalangeal and below the center axis of rotation of the proximal interphalangeal joint. Additionally the shock absorbing padding may overlie areas of the metacarpals of the index, long, ring, and small fingers below the center axis of rotation of the metacarpalphalangeal joints.

Even more particularly, the present invention provides a work glove having a dorsal side panel and a palmar side panel wherein the dorsal side panel is sized to cover the back, thumb, and fingers of the dorsal side of a human hand and the palmar side panel is sized to cover the palmar side of the human hand, including the palm, thumb and fingers. The dorsal side panel and the palmar side panel are secured along each panel's outer periphery to define a glove body with an opening therein to receive a human hand. Particularly, the glove body is provided with a thumb and fingers section for receiving a thumb and fingers of the human hand. Shock absorbing pads are provided to overlie selected areas defined by the location of anatomical parts of the human hand when inserted into the glove. Specifically, the shock absorbing padding, which is usually a foam rubber or another foam elastomeric material of approximately ¼" in thickness, is disposed to overlie at least the distal halves of the index finger and long finger metacarpals excluding the metacarpal joints of the index finger and the long finger. Furthermore, and preferably, a thumb ulnar protective padding is disposed along the thumb stall at a location to be along an ulnar border of the thumb proximal phalanx between the metacarpalphalangeal joint and the interphalangeal joint as well as padding over the A2 pulley of the proximal phalanx between the metacarpalphalangeal joint and the interphalangeal joint.

Further objects and advantages of this invention will appear from the following description and appended claims, reference being had to the accompanying drawings forming a part of the specification wherein like references designate corresponding parts into several views.

BRIEF DESCRIPTION OF THE DRAWINGS

A better understanding of the invention will be had upon reference to the following description in conjunction with the accompanying drawings in which like numerals refer to like parts throughout the several views and wherein.

DESCRIPTION OF THE PREFERRED EMBODIMENTS

A. BATTING GLOVE

Figure 1:
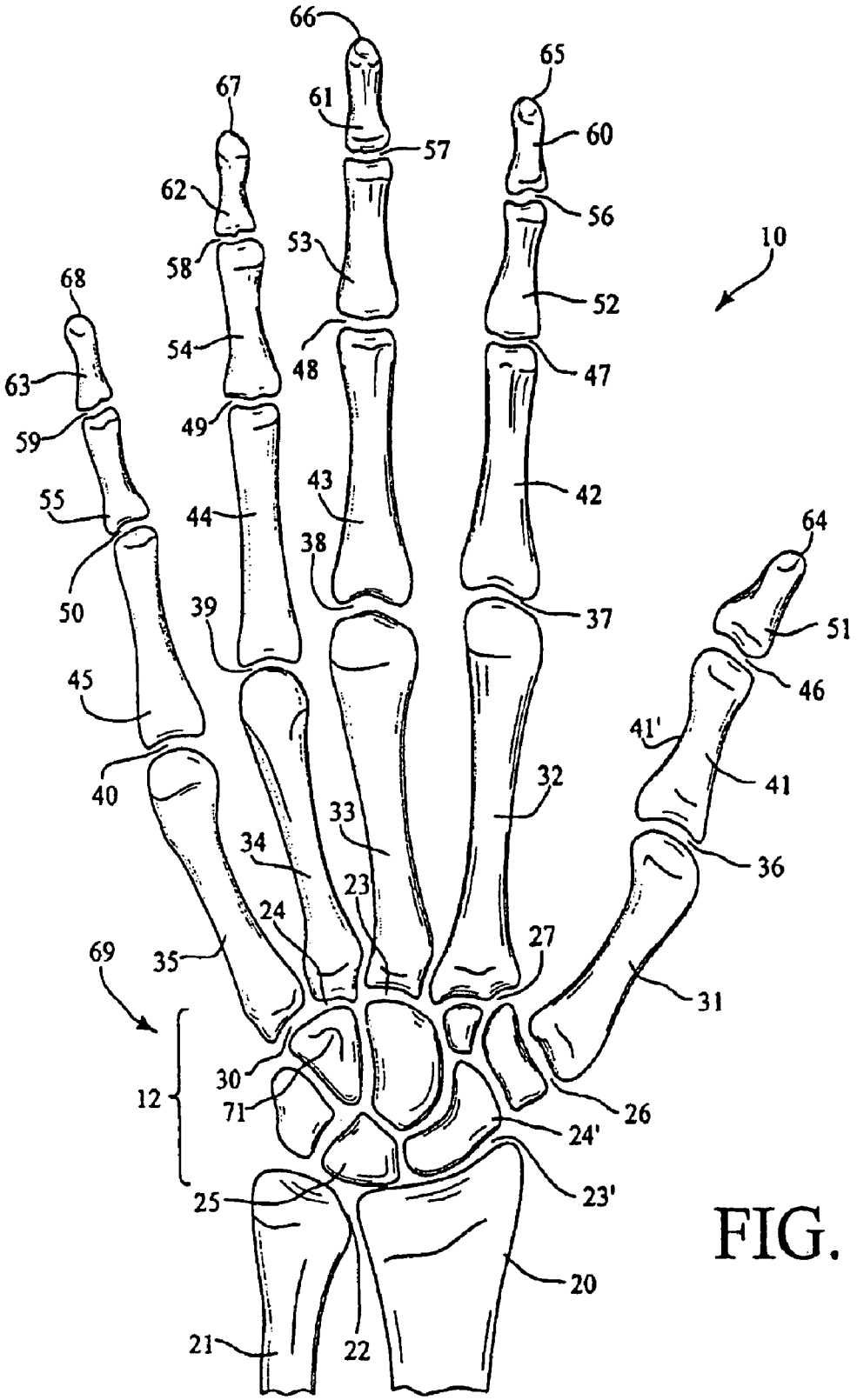
FIG. 1 is a bottom schematic anatomical view of the bones of a right-side human hand showing the palm-side details.

FIG. 1 is a schematic anatomical view of the bones of a right human hand 10 looking at a palm 18 side. Shown are the radius 20, ulna 21, radiocarpal joint (RC) 23', distal radio ulnar joint (DRUJ) 22, wrist 12, thumb 64, index finger 65, long finger 66, ring finger 67, and small finger 68. The carpus 69 comprises eight carpal bones, seven of which are shown in FIG. 1 and includes the hamate bone 71 with its hook-like protrusion, the scaphoid 24' and the lunate 25.

The thumb 64 is comprised of the distal phalanx 51, the interphalangeal joint (IP) 46, proximal phalanx 41, diaphysis of proximal phalanx 41', metacarpalphalangeal joint (MCP) 36, metacarpal 31, and carpometacarpal joint (CMC) 26.

The index finger 65 is comprised of the distal phalanx 60, distal interphalangeal joint (DIP) 56, middle phalanx 52, proximal interphalangeal joint (PIP) 47, proximal phalanx 42, metacarpalphalangeal joint (MCP) 37, metacarpal 32, and carpometacarpal joint (CMC) 27.

The long finger 66 is comprised of the distal phalanx 61, distal interphalangeal joint (DIP) 57, middle phalanx 53, proximal interphalangeal joint (PIP) 48, proximal phalanx 43, metacarpalphalangeal joint (MCP) 38, metacarpal 33, and carpometacarpal joint (CMC) 23.

The ring finger 67 is comprised of the distal phalanx 62, distal interphalangeal joint (DIP) 58, middle phalanx 54, proximal interphalangeal joint (PIP) 49, proximal phalanx 44, metacarpalphalangeal joint (MCP) 39, metacarpal 34, and carpometacarpal joint (CMC) 24.

The small finger 68 is comprised of the distal phalanx 63, distal interphalangeal joint (DIP) 59, middle phalanx 55, proximal interphalangeal joint (PIP) 50, proximal phalanx 45, metacarpalphalangeal joint (MCP) 40, metacarpal 35, and carpometacarpal joint (CMC) 30.

Figure 1A:
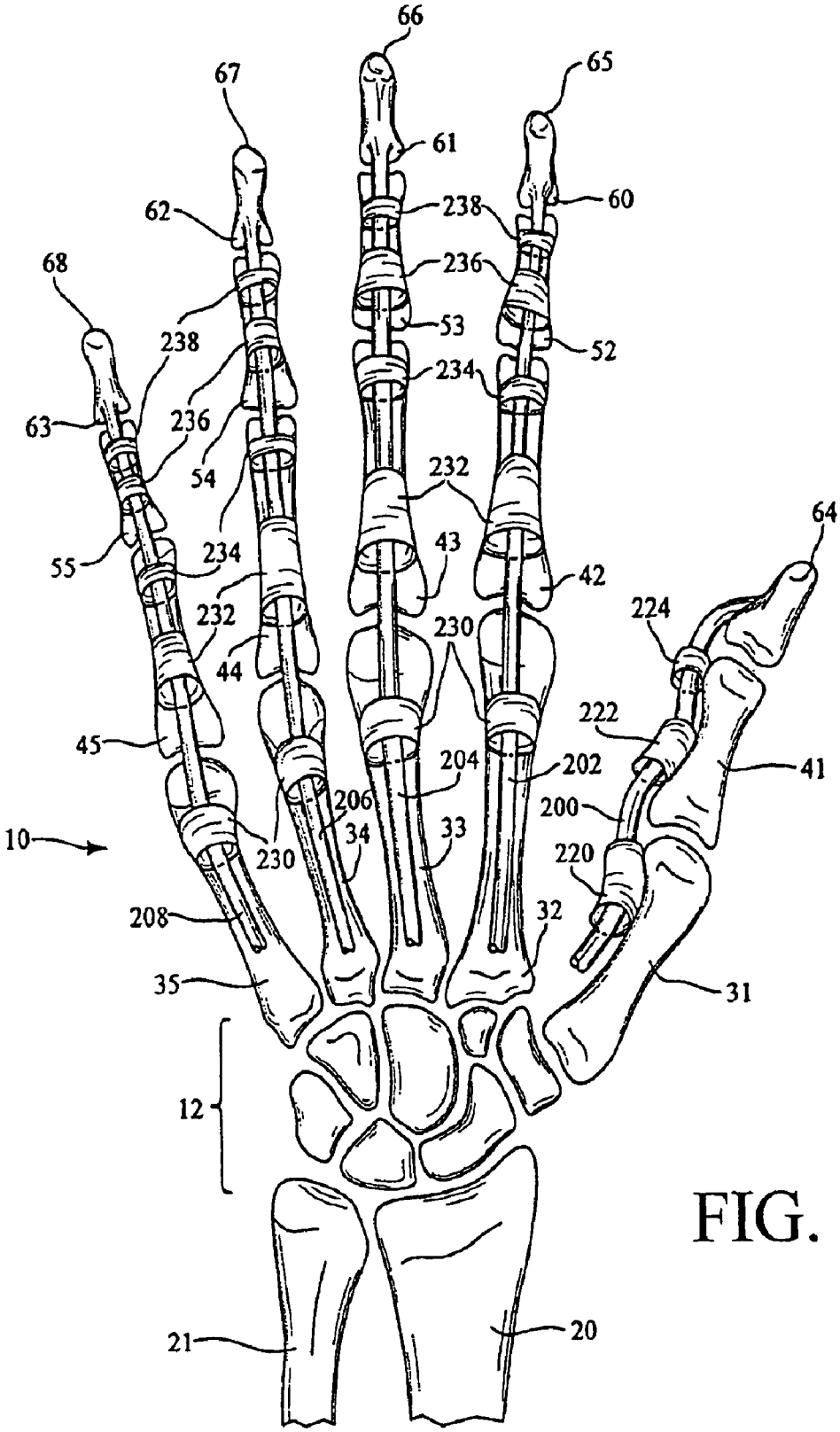
FIG. 1A is a bottom schematic anatomical palm-side view of the bones, and selected details of the pulleys and tendons of a right-side human hand.

FIG. 1A shows the skeletal anatomy, pulley system, and flexor tendons of the thumb 64 and fingers 65-68 of the right hand 10. The thumb 64 includes the flexor tendon (flexor pollicis longus) 200 and the three pulleys 220-224 of the thumb 64; an A1 pulley 220, A2 pulley 222, and A3 pulley 224. The A2 pulley 222 is the most important for function and is attached to the proximal phalanx 41 of the thumb 64. The respective pulleys 230-238 are also shown for each of the: index finger 65, long finger 66, ring finger 67, and small finger 68. Each finger 65-68 has five pulleys 230-238; an A1 pulley 230, A2 pulley 232, A3 pulley 234, A4 pulley 236, and A5 pulley 238. The A2 pulley 232 and A4 pulley 236 are considered to be the most important for function. The A2 pulley 232 is attached to the proximal phalanx 42-45. The A4 pulley 236 is attached to the middle phalanx 52-55. The A1 pulley 230 is near the MCP joint 37-40, the A3 pulley 234 is near the PIP joint 47-50 and the A5 pulley 238 is near the DIP joint 56-59.

Figure 4:
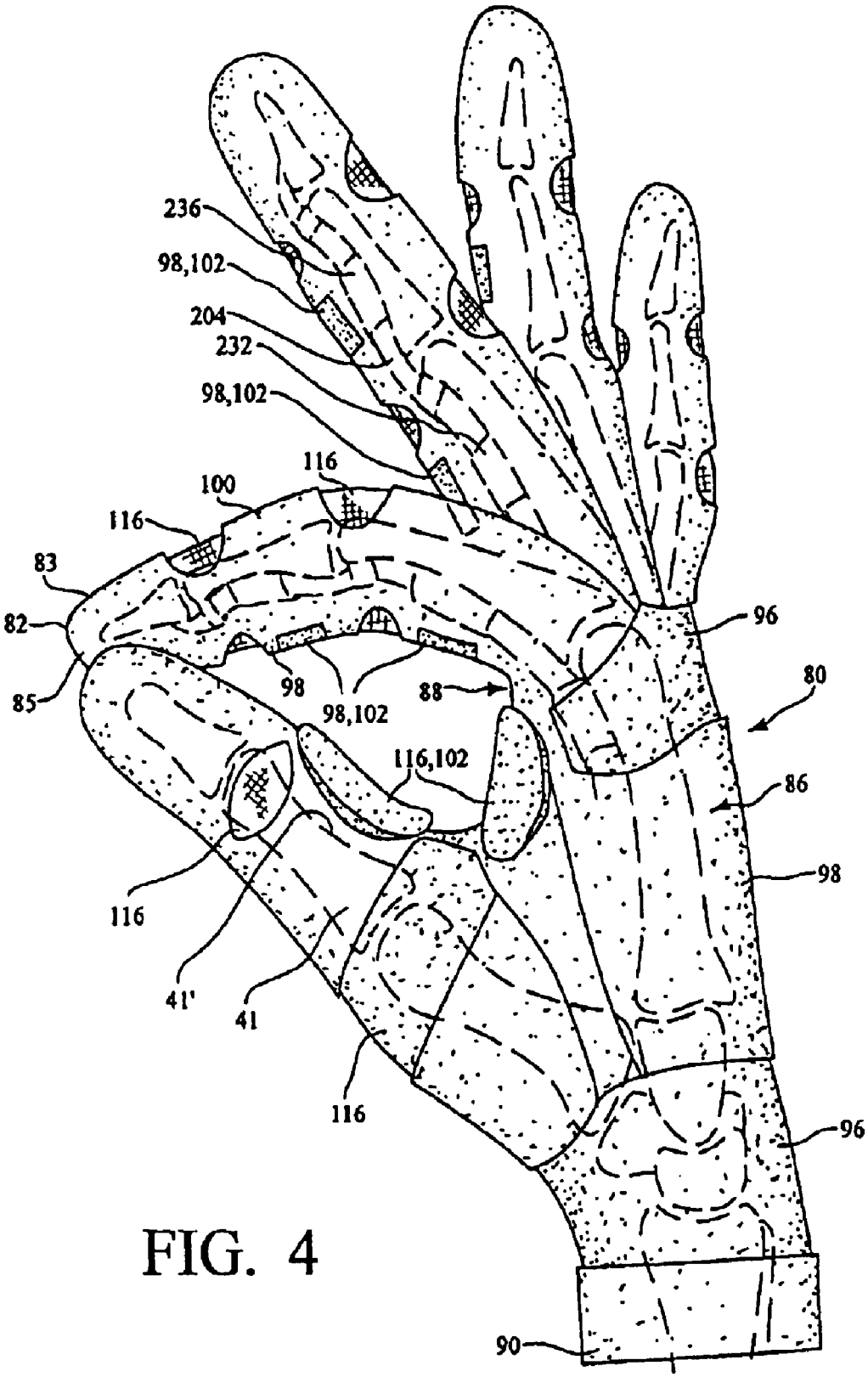
FIG. 4 is a radial side view of a batting glove of a preferred embodiment of the present invention showing relevant details and seen overlaying the skeletal structure of a right-side human hand.

The flexor tendons 202-208 are shown as one unit for each finger 65-68, but actually there are two flexor tendons to each unit. They are the flexor digitorum superficialis and the flexor digitorum profundus (shown as one, 202-208). These tendons 202-208 travel underneath the pulleys 230-238 and the flexor digitorum profundus tendon attaches to the distal phalanx 60-63 of each finger 65-68. The tendons 202-208 move back and forth below the pulleys 230-238, via muscles (not shown) attached to the proximal end of the tendons. This movement of the tendon 202-208 produces finger 65-68 flexion. The pulleys 230-238 prevent the flexor tendons 202-208 from bowstringing or moving away from the bone with finger 65-68 flexion. If the pulleys 230-238 are damaged and no longer function, the tendons 202-208 will bowstring with a resultant significant loss of finger motion as well as grip strength. As such, pulleys 230-238, especially the A2 pulley 232 and the A4 pulley 236, are very important and must be preserved and protected as much as possible. As shown in FIG. 4, protective padding 102 for each finger 65-68 is placed in an anatomically designed fashion over the A2 and A4 pulley regions. When the A2 and A4 pulleys 232 and 236 are preserved, adequate finger 65-68 motion and grip strength is maintained.

In FIGS. 2-5, a preferred batting glove 80 is provided for either a right, left, or both human hand(s) 10, as desired. A glove 80 for a left hand 10 utilizes symmetrical placement of the elements, materials, and thicknesses herein described.

Figure 2:
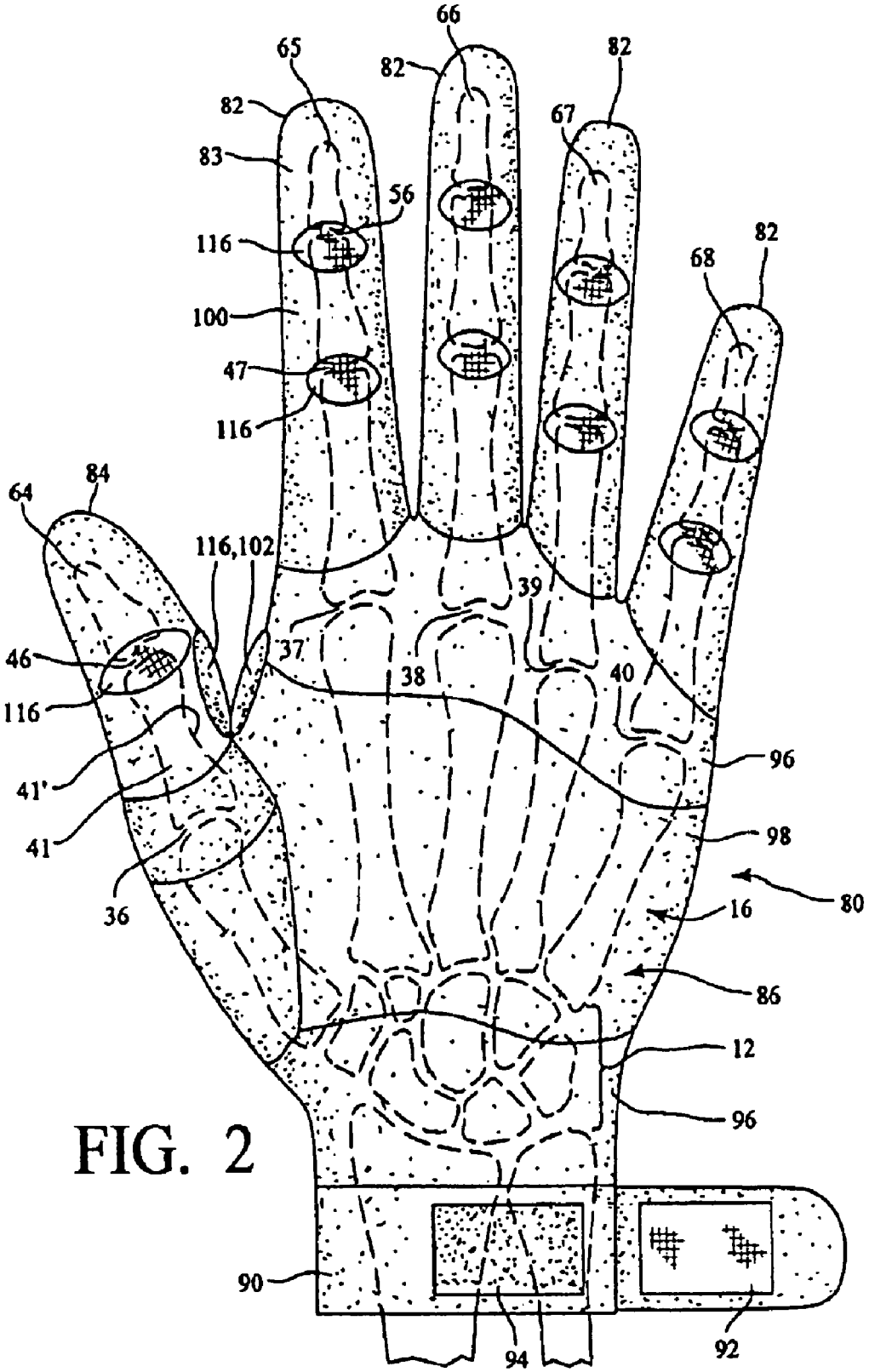
FIG. 2 is a top view of a batting glove of a preferred embodiment of the present invention showing the dorsal-side details and seen overlaying the skeletal structure of a right-dorsal-side human hand.

FIG. 2 shows details of a dorsal side of a batting glove 80 to cover a human hand 10 and seen overlaying the skeletal structure and skin outline of a right-dorsal-side human hand 10.

The batting glove 80 has a plurality of finger elements 82, a thumb element 84, a top portion 86, and a lower portion 88 (see FIGS. 3-5), wherein the finger elements 82 cover fingers 65-68. The thumb element 84 covers a thumb 64, and the top portion 86 covers a back side 16 of the hand 10. The lower portion 88 covers the palm side 18 of the hand 10.

An elastic band 90 is attached to the top portion 86 and to the lower portion 88. The elastic band 90 includes a securing means in the form of a hook 92 and loop 94 fastener for retention above a human wrist 12.

The top portion 86 includes elastic material 96, preferably 2-WAY SPANDEX® in the vicinity of the wrist 12 out to the vicinity of the metacarpalphalangeal joints (MCP) 37-40 of the fingers 65-68 of the hand 10. Additionally, a protective covering 98 is centrally located to cover the back side 16 of the hand 10.

The finger elements 82 each include an upper portion 83 which includes synthetic material 100 with openings formed therein to receive thin elastic material 116 attached to cover the proximal interphalangeal joints (PIP) 47-50, and the distal interphalangeal joint (DIP) 56-59 of each finger 65-68.

Figure 3:
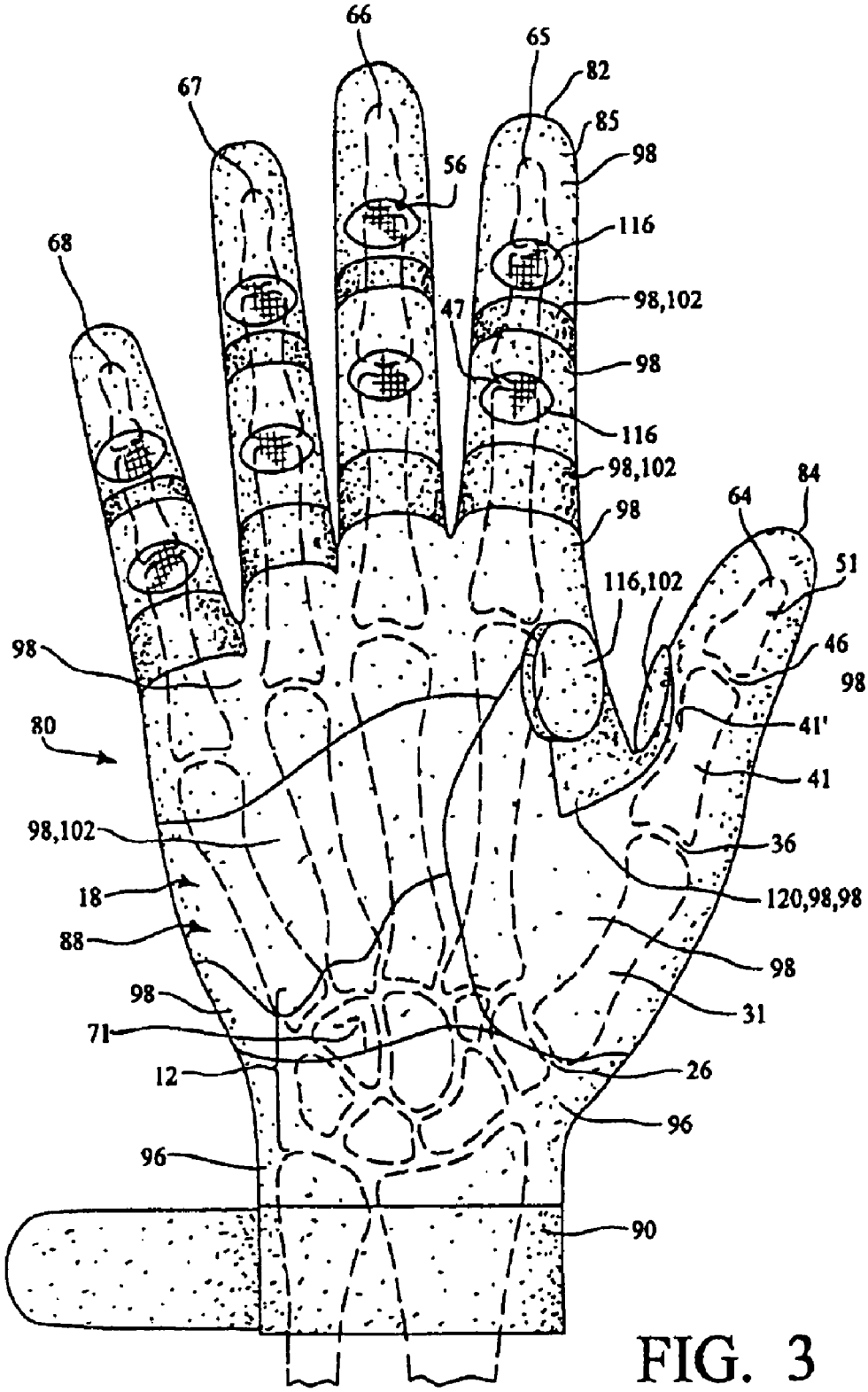
FIG. 3 is a bottom view of a batting glove of a preferred embodiment of the present invention showing the palm-side details and seen overlaying the skeletal structure of a right-palm-side human hand.

As shown in FIG. 3, a lower portion 85 of the finger elements 82 includes protective covering 98. In addition, protective padding 102 is affixed beneath the protective covering 98 and adjacent to the fingers 65-68, in preselected areas. As shown in FIGS. 3 and 4, protective padding 102 and protective covering 98 cover the middle phalanx 52-55—specifically the A4 pulley 236 region, and the proximal phalanx 42-45—specifically the A2 pulley 232 region, of each finger 65-68. Openings are formed in the lower portion 85 to receive thin elastic material 116 attached to cover the palm-side 18 of the proximal interphalangeal joints (PIP) 47-50, and the distal interphalangeal joints (DIP) 56-59 of each finger 65-68.

The thumb element 84 includes protective covering 98 which surrounds the distal phalanx 51, metacarpalphalangeal joint (MCP) 36, proximal phalanx 41, metacarpal 31, and carpometacarpal joint (CMC) 26 of the thumb 64. As shown in FIG. 2, an opening is formed in the protective covering 98 to receive thin elastic material 116 attached to cover the interphalangeal joint (IP) 46 of the thumb 64. Another opening is formed in the protective covering 98 over the metacarpalphalangeal joint (MCP) 36 to receive thin elastic material 116. As shown in FIGS. 2-5, a piece of protective padding 102, which is itself covered by thin elastic material 116, is affixed to an area on the thumb element 84 and centered on an ulnar border (inside) of the thumb 64 over the diaphysis of proximal phalanx 41' of the thumb 64. The diaphysis of proximal phalanx 41' is found between the metacarpalphalangeal joint (MCP) 36 and interphalangeal joint (IP) 46 of the thumb 64.

Referring again to FIG. 3, the bottom portion 88 includes elastic material 96 in the vicinity of the wrist 12. Out from the wrist 12 area, the bottom portion 88 includes protective covering 98 continuing out to the vicinity of the metacarpalphalangeal joints (MCP) 36-40 and located to cover the palm 18 of the hand 10. A piece of protective padding 102 is affixed to a central palm 18 area underneath the protective covering 98 and placed at a preselected distance below a center axis of rotation of the metacarpalphalangeal joints (MCP) 37-40 and extending to a preselected distance above the hook of the hamate 71.

Figure 3A:
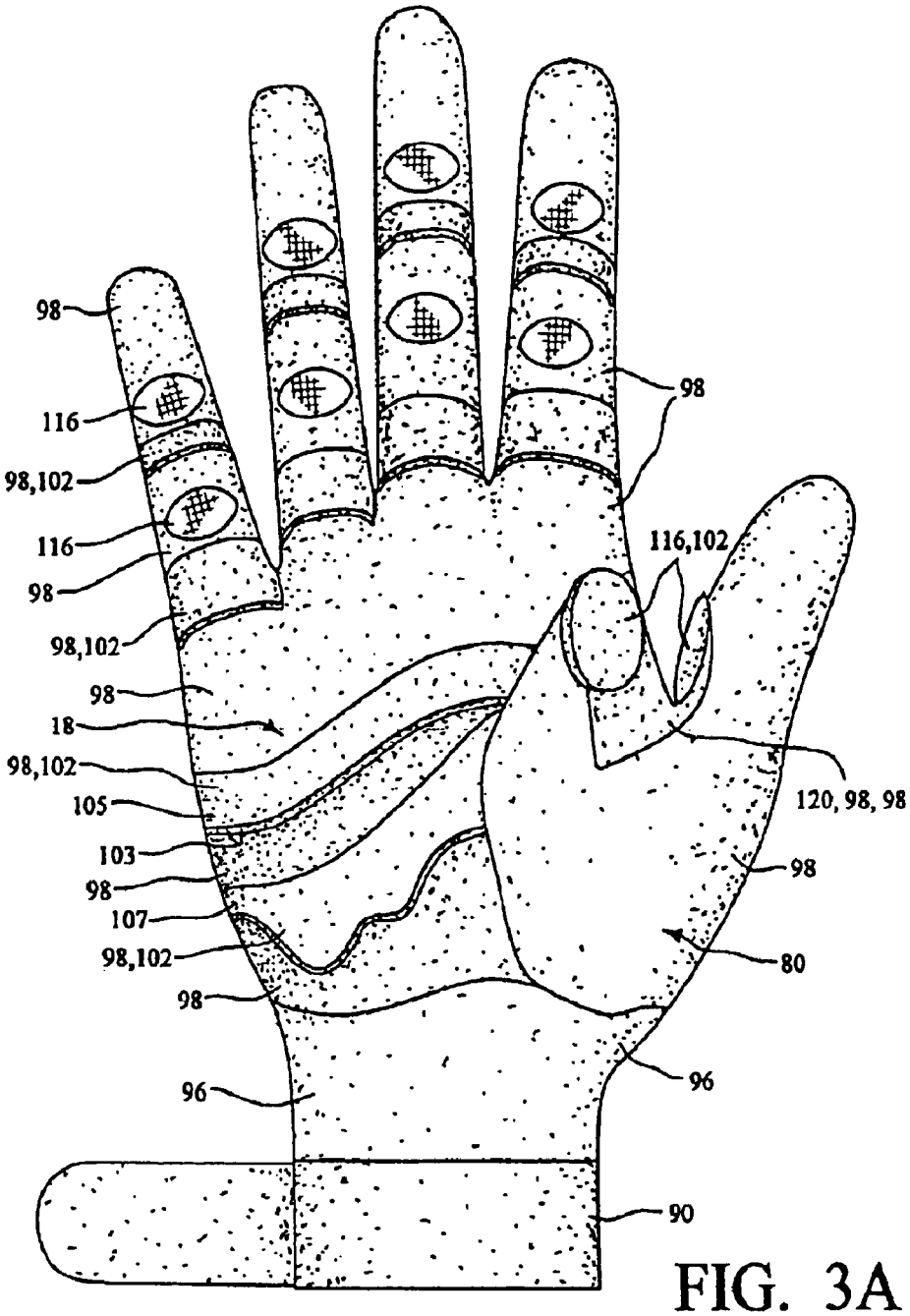
FIG. 3A is a bottom view of another batting glove of a preferred embodiment of the present invention showing relevant palm-side details.

As shown in FIG. 3A, another preferred embodiment of the batting glove 80 is similar to the glove 80 of FIG. 3, but is distinguished wherein a central portion 103 of the central palm 18 area is provided having no protective padding 102 and abutting two separate sections, a first section 105, and a second section 107. Both the first section 105 and the second section 107 include affixing protective padding 102 underneath the protective covering 98. The central portion 103 includes protective covering 98, but no protective padding 102. When viewed as in FIG. 3A, an overall outline of the central palm 18 area is similar to that of the glove of FIG. 3, except that the central portion 103 appears to be relieved or depressed in relation to the first section 105 and the second section 107.

Referring back to FIG. 3, a first web 120 is formed in the area where the thumb element 84 is in proximity to the index finger 65. An additional piece of protective covering 98 (thereby creating a double thickness of protective covering 98) is affixed over the first web 120. A piece of protective padding 102 covered by thin elastic material 116 is affixed over the additional piece of protective padding 98 over the first web 120 to cover an area which is contacted by protective padding 102 of the thumb element 84. When the glove 80 is worn by a wearer, the bottom portion 88 contacts the remainder of the palm 18.

Figure 5:
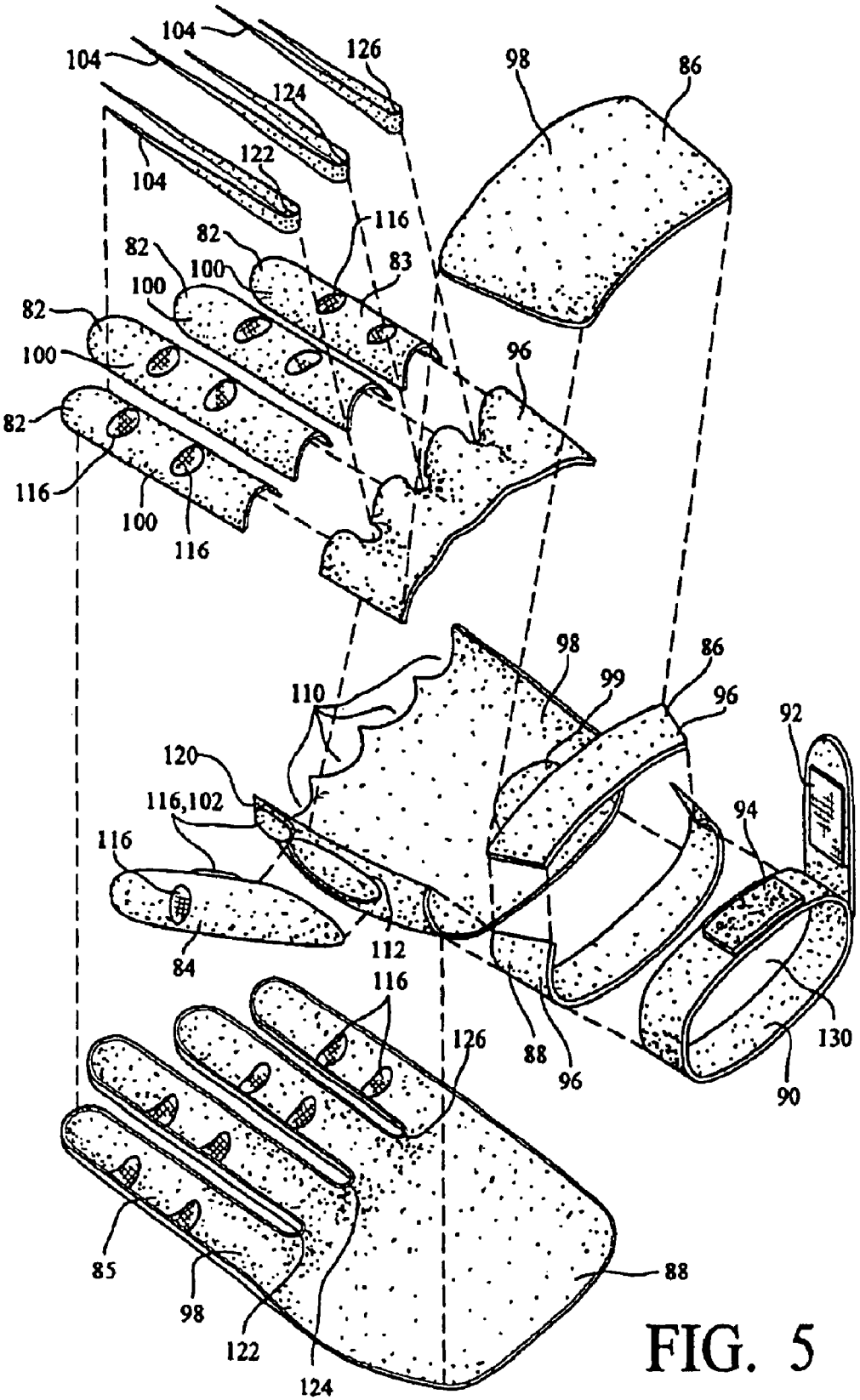
FIG. 5 is an exploded view of some of the major components of a batting glove of a preferred embodiment of the present invention.

Referring to FIG. 5, the bottom portion 88 is attached to the top portion 86 to enable an entire covering of the palm 18 and the back side 16 of the hand 10 along an outer periphery having at selected locations a plurality of finger openings 110, a thumb opening 112, and a main opening 130. Second, third and fourth webs, 122, 124, and 126, respectively, are formed between adjacent fingers 65-68. The finger elements 82 are fixedly attached to each of the finger openings 110. The batting glove 80 further provides the finger elements 82 with elastic webbing material 104 affixed laterally therebetween beginning at a tip of the index finger 65 down to the second web 122, running up to the long finger 66 and continuing likewise terminating at the tip of the small finger 68 just past the fourth web 126. Soft padding 99 such as terry cotton is placed as desired inside of the batting glove to cover the thicker protective padding 102, preferably in the areas of the palm 18 and pulleys of the fingers 65-68, and to provide for the comfort of the wearer.

Materials used in manufacture are preselected to achieve various goals as follows:

Synthetic material 100, such as, for example, JANEC SUPER® is used dorsally over the fingers 65-68 of the hand 10;

2-Way Elastic material 96, such as, for example, 2-WAY SPANDEX® is used in motion zones of the hand 10 to allow glove 80 movement;

Thin elastic material 116, such as, for example, LYCRA® is used to cover areas on the glove 80 based on centers of axes of rotation of all joints of the fingers 65-68 and thumb 64 of the hand 10;

Protective covering 98, such as, for example, cabretta skin (Indonesian sheep skin) is used to provide for protection from abrasion and direct shock applied to the hand in gripping a bat (not shown) and hitting a ball (not shown) with the bat; and, Protection padding 102, such as, for example, rubber foam of 1/16" in thickness, is used to enhance a gripping surface of he fingers 65-68, specifically the regions of the A2 pulley 232 and A4 pulley 236, and in the palm 18 and first web 120 in order to reduce the most severe of shocks transmitted to the hand 10.

The disclosure given is applicable not only to batting gloves, but also to gloves intended for use in various other activities such as, for example, golf, and working in the outdoors to include gardening. Protection for the hands 10 during use in such activities is achieved by measures such as, for example, varying quantity, placement, thickness, dimensions, and elastic qualities of pads, coverings, elastic materials and openings, as appropriate.

B. BLOCKER GLOVE

Figure 6:
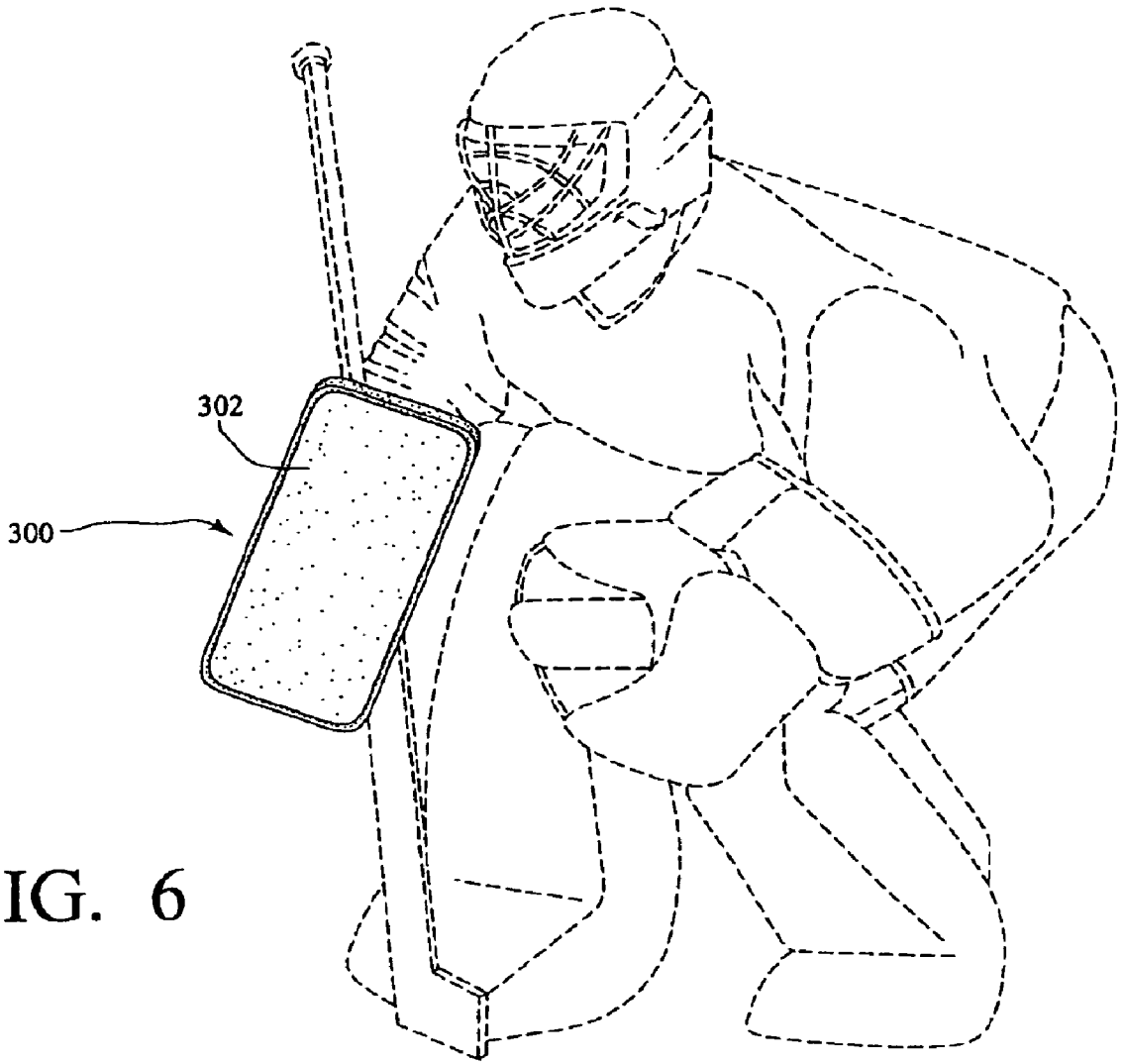
FIG. 6 is a perspective view of a blocker glove of the present invention with a goaltender shown in phantom lines.
Figure 7:
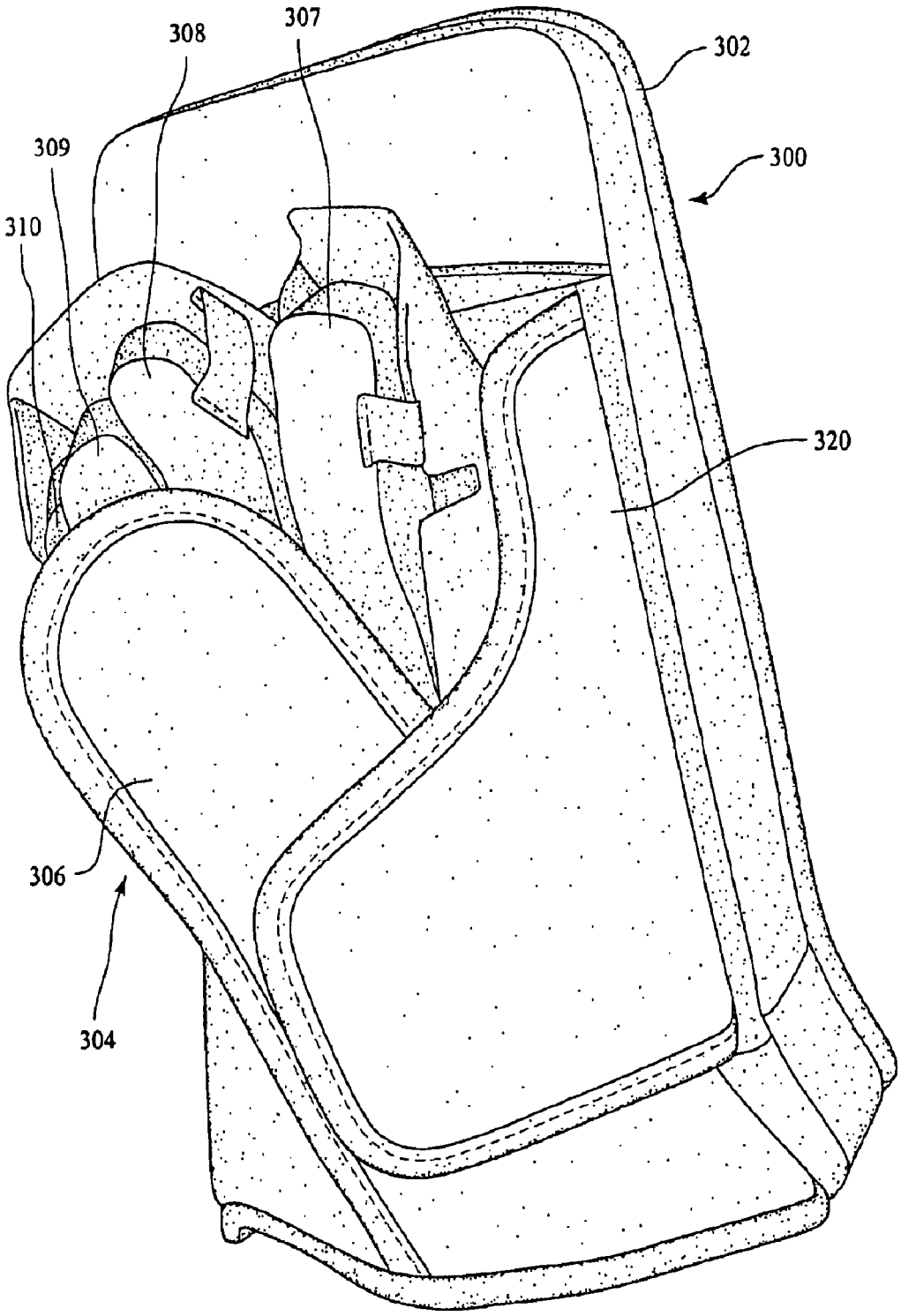
FIG. 7 is a perspective view of the blocker glove of FIG. 6 showing the palm side of the glove.
Figure 8:
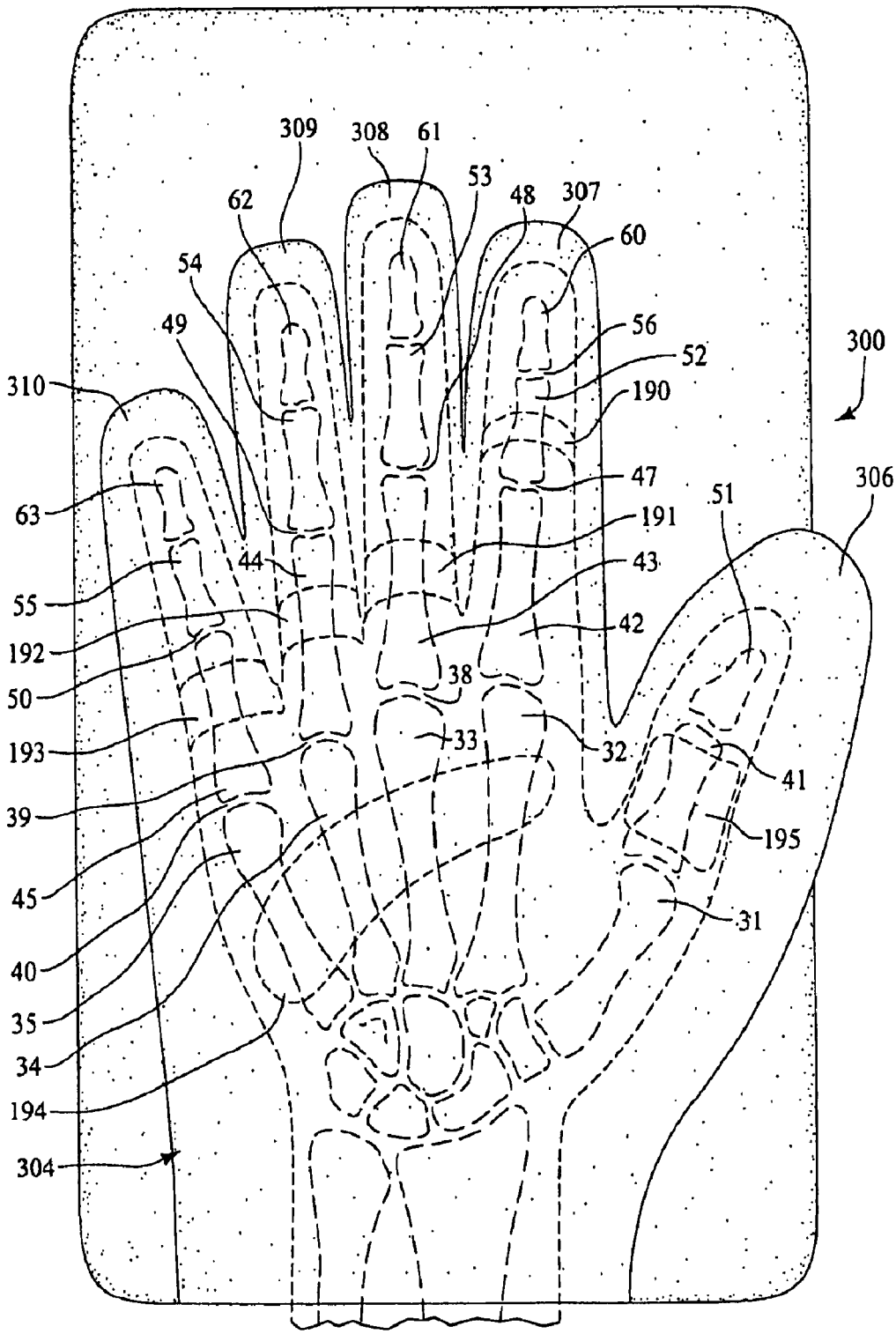
FIG. 8 is a bottom view of a preferred hockey goaltender's blocker glove showing the palmar-side details and seen overlaying the skeletal structure of a right-palmar-side human hand inserted into the glove showing location for shock absorbing pads.
Figure 9:
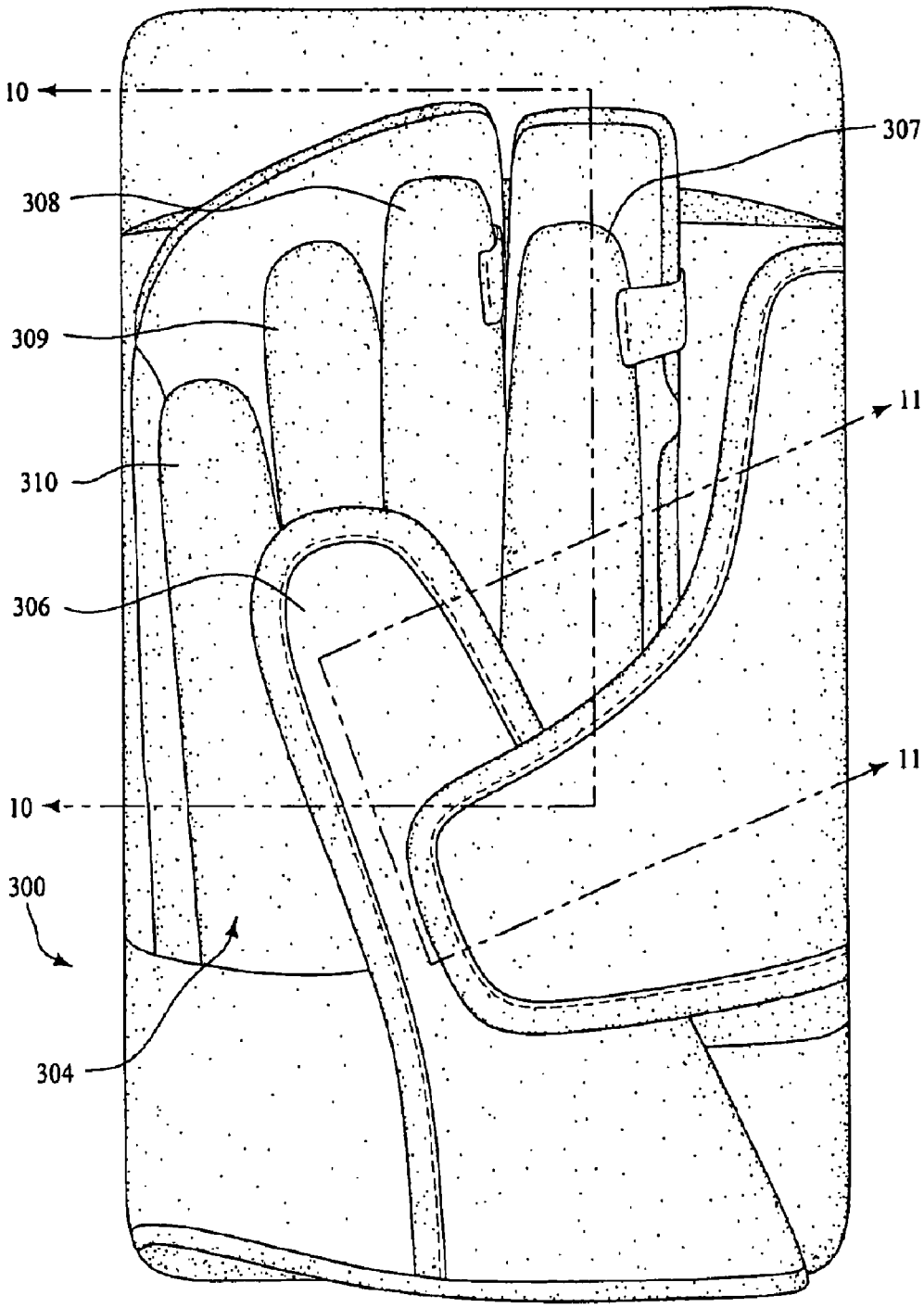
FIG. 9 is a bottom view of the hockey goaltender's blocker glove.
Figure 10:
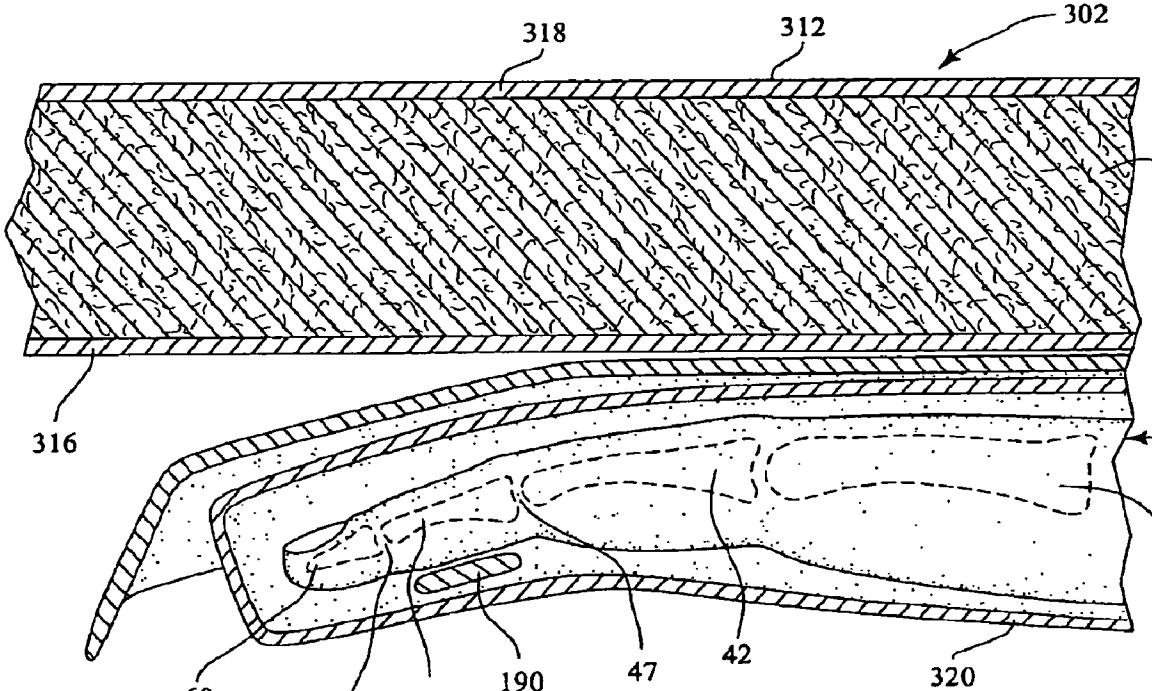
FIG. 10 is a sectional view taken along line 10-10 of FIG. 9.
Figure 11:
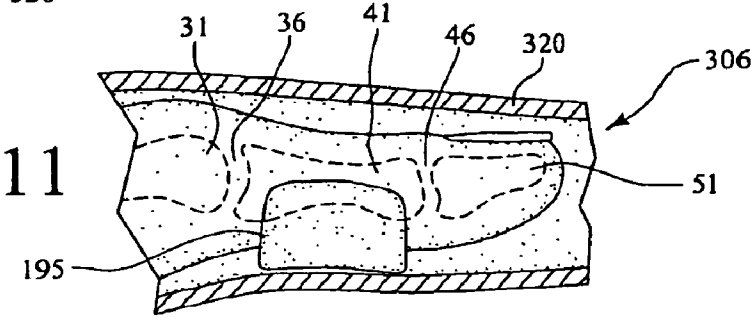
FIG. 11 is a sectional view taken along line 11-11 of FIG. 9.

The goaltender's blocker glove identified by the numeral 300 is shown in FIGS. 6 and 7. A blocking pad 302 covers a major portion of the hand, wrist, and forearm of the goalie and may be of any conventional shape but is shown as being rectangular with a preselected thickness of padding material 314 (FIG. 10) within the cover provided, the cover being an enclosed sewn construction including a back cover portion 316 and a face cover portion 318. The cover may be made of any conventional durable and flexible material with one preferred embodiment being of a nylon that exhibits both superior abrasion and tear resistance and easily conventionally cut and sewn in the manner of any fabric material. A glove 304 is shown affixed by any well known means to the back cover 316 and includes a thumb portion 306, an index finger portion 307, a long finger portion 308, a ring finger portion 309, and a small finger portion 310. The thumb portion 306 extends around the finger portions and wrist to provide extra padding over the sensitive wrist found in the index finger regions and is folded over to protect the wrist and lower portion of the palmar side of the hand. Additional wrist padding may also be provided to fit over the wrist portion of the user and the glove may be of any conventional size and shape known in the art.

As best shown in FIGS. 8-11, a preferred hockey goaltender blocker glove 300 is provided for the right human hand. The glove 304 includes a covering 320 which may be of either unitary construction or include a plurality of sections to cover the finger sections 307-310. The glove covering is made of any suitable material known in the art, such as leather, or the like. Along the bottom portion of the covering 320 is attached a plurality of shock absorbing pads positioned at specific areas to protect, particularly, the A2 pulley region 222 (FIG. 1A) and the proximal phalanx 41 of the thumb above the metacarpalphalangeal joint 36 and below the center axis of rotation of the interphalangeal joint 46. Additional padding may be provided to cover the middle phalanx 52 of the index finger above the proximal interphalangeal joint 47 and below the center axis of rotation of the distal interphalangeal joint as indicated by the numeral 56, as well as the proximal phalanxes 43, 44, and 45, of the long finger, ring finger and small finger, respectively. The shock absorbing padding 195 is provided over the thumb in the A-2 pulley region of the proximal phalanx 41 between the metacarpalphalangeal joint 36 and the center axis of rotation of the interphalangeal joint 46, as shown in FIG. 2. Padding 190 is positioned above the proximal interphalangeal joint 47 and below the center axis of rotation of the digital interphalangeal joint as indicated by the numeral 56. Padding 191 is positioned above the metacarpalphalangeal joint 38 and below the center axis of rotation of the proximal interphalangeal joint as indicated by the numeral 48. Padding 192 is positioned to overlie the proximal phalanx 44 and is positioned between the metacarpalphalangeal joint 39 and the center axis of rotation of the proximal interphalangeal joint as indicated at the numeral 49. Padding 193 is positioned to overlie the proximal phalanx 45 of the small finger above the metacarpalphalangeal joint 40 and below the center axis of rotation of the proximal interphalangeal joint as indicated at the numeral 50. Shock absorbing pad 194 may also be provided to overlie the metacarpals 32, 33, 34 and 35 of the index finger, the long finger, the ring finger and the small finger. Shock absorbing pad 194 overlies metacarpals 32, 33, 34, and 35 and is positioned between the carpometacarpal joints 27, 23, 24, and 30 (FIG. 1) and the center axis of rotation of the metacarpalphalangeal joints of each of the fingers 65, 66, 67, and 68 also as shown in FIG. 1. The protective shock absorbing padding is placed in the aforementioned anatomically designed fashion as shown in cutaway of the index finger section in FIG. 10 to illustrate the pulleys and tendons regions protected with the motion zones defined by the center axis of rotation of the appropriate joints being left free. This enables the movement of the fingers and thumb without adverse effects when in use.

C. WORK GLOVE

Figure 12:
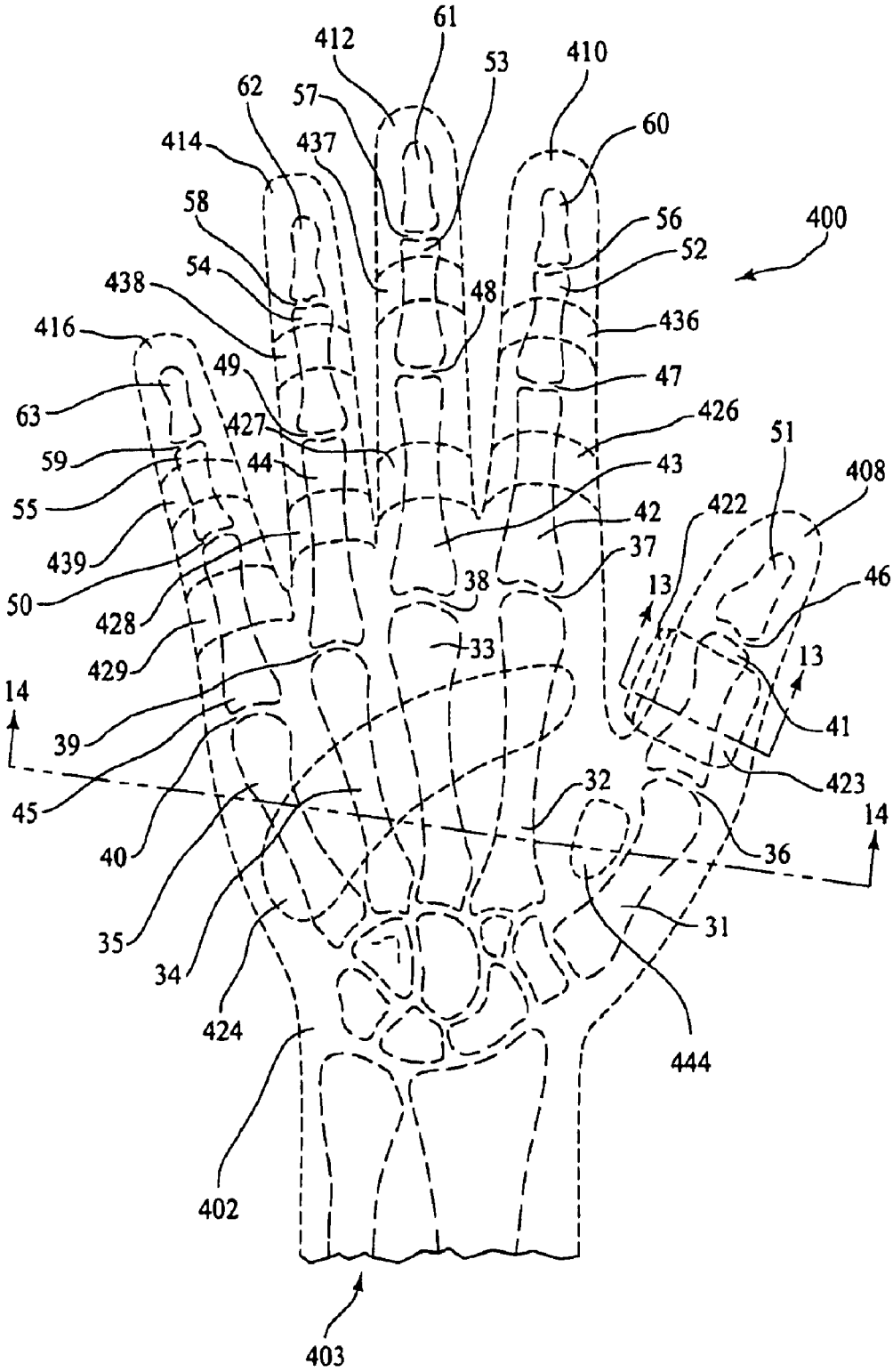
FIG. 12 is a palmar side view of a glove of the present invention showing relevant details and seen overlying the skeletal structure of a right hand.
Figure 13:
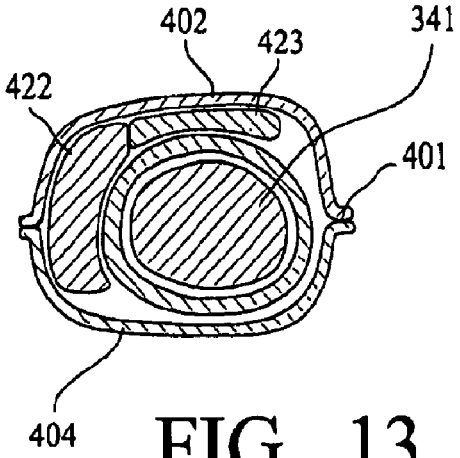
FIG. 13 is a sectional view taken along line 13-13 of FIG. 12.

As best shown in FIGS. 12-13, a preferred glove 400, particularly useful as a work glove including gardening, is provided for the right human hand. The glove 400 outlined in phantom lines, includes a palmar side panel 402 and a dorsal side panel 404. The two panels are generally stitched together along their outer periphery as indicated by the numeral 401 and are sized to define a plurality of finger stalls and a thumb stall. The finger stalls are identified by the numerals 410 for the index finger, 412 for the long finger, 414 for the ring finger and 416 for the small finger. The thumb stall is identified as 408. The glove 400 is also provided with an opening 403 to receive the human hand therein. The glove panels 402, 404 are made of any suitable material known in the art, such as leather, or the like. Along the bottom portion of the palmar side panel 402 is attached at least a palmar protective padding 424 which overlies at least the distal halves of the index finger and long finger metacarpals 32 and 33, respectively, and may include the metacarpals 34 and 35 of the ring finger and the little finger also. In a preferred embodiment, an ulnar protective pad 422 is provided along the thumb stall at a location adapted to be along an ulnar border of the thumb proximal phalanx 41 between the metacarpalphalangeal joint 36 and the interphalangeal joint 46 as well as a thumb A2 pulley protective padding 423 disposed along the thumb stall of the thumb proximal phalanx 41 between the metacarpalphalangeal joint 36 and the interphalangeal joint 46. Padding 423 is below the center axis of rotation of the interphalangeal joint 46. Even though padding 422 and 423 are shown as separate padding it is realized that padding 422, 423 may be unitary. Additional padding 426 may also be provided to cover the proximal phalanx 42 above the metacarpalphalangeal joint 37 and below the center axis of rotation of the interphalangeal joint 47. Other padding may also include shock absorbing padding 427, 428 and 429 which are placed over the proximal phalanxes 43, 44 and 45 of the long finger 66, the ring finger 67, and the small finger 68, respectively. The padding will be positioned above the metacarpalphalangeal joints 38, 39 and 40, respectively, and below the center axis of rotation of 30 the proximal interphalangeal joints 48, 49 and 50, respectively. Even additional shock absorbing padding may be placed over the middle phalanxes 52, 53, 54 and 55 and identified as 436, 437, 438 and 439, respectively. The paddings 436, 437, 438 and 439 are positioned above the proximal interphalangeal joints 47, 48, 49 and 50 and below the center axis of rotation of the distal interphalangeal joints as indicated by the numerals 56, 57, 58 and 59, respectively. The protective shock absorbing padding being placed in the aforementioned anatomically designed fashion protects the pulleys and tendons of the fingers and thumb while leaving the center axis of rotation of the appropriate joints free. This enables the movement of the fingers and thumb without adverse effects when in use.

Figure 14:
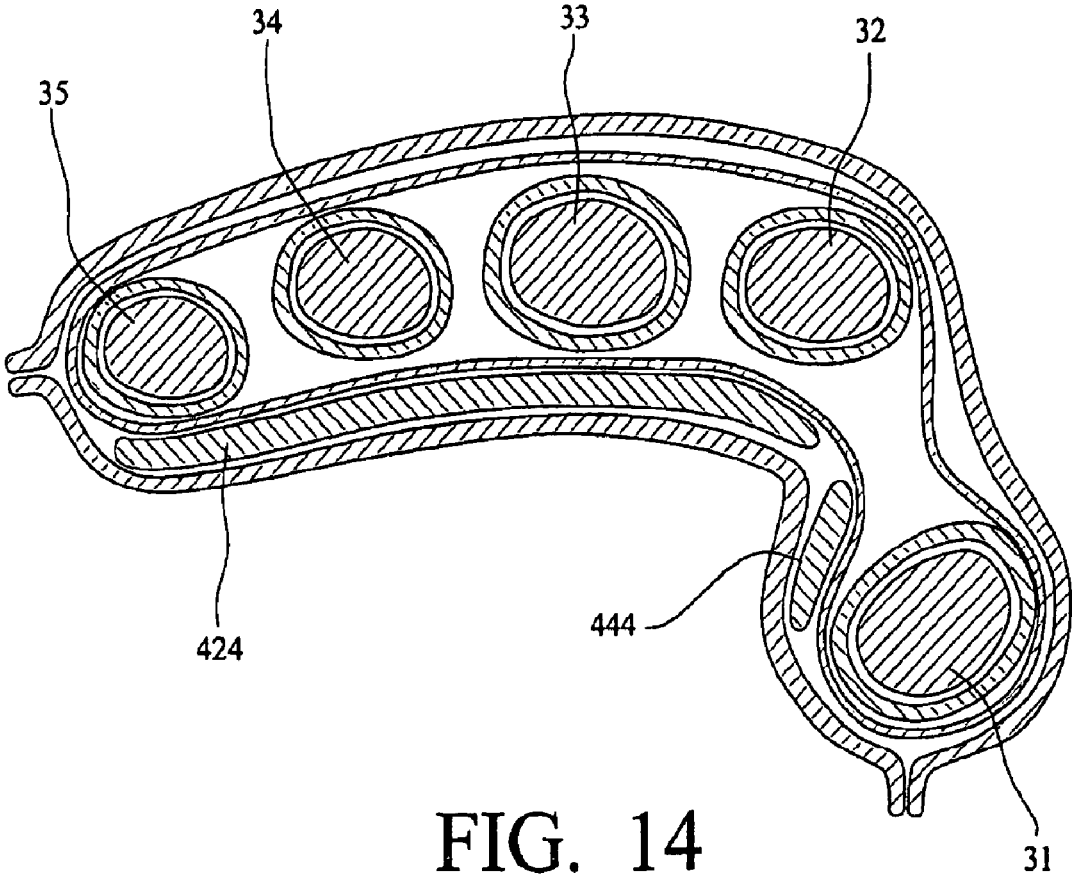
FIG. 14 is a sectional view taken along line 14-14 in FIG. 12.

As shown in FIGS. 13 and 14, an additional pad identified as 444 may be located to overlie the thumb metacarpal 31 between the center axis of rotation of the metacarpalphalangeal joint 36 and the carpometacarpal joint 26.

The detailed description is given primarily for clearness of understanding and no unnecessary limitations are to be understood therefrom for modifications will become obvious to those skilled in the art upon reading this disclosure and may be made without departing from the spirit of the invention and scope of the appended claims.

What is claimed is:

1. A glove *constructed to fit a hand of pre-determined size for protecting selected anatomical portions thereof,* comprising:

a palmar side panel and a dorsal side panel secured along each panel's outer periphery with an opening therein to receive [a human] *said* hand, said dorsal side panel being sized to cover the back of said hand and in conjunction with said palmar side panel providing a thumb stall and a plurality of finger stalls for receiving a thumb and fingers of a human hand;

*said thumb stall having a palm side, a dorsal side and an ulnar border along an inside of said thumb stall toward said plurality of finger stalls;* a thumb ulnar protective padding disposed along said thumb stall at a location adapted to be placed along [an] *said* ulnar border of said thumb proximal phalanx between a [metacarpaiphalangeal] *metacarpalphalangeal* joint and [a proximal] *an* interphalangeal joint, *said metacarpalphalangeal joint being absent of padding*;

a palmar protective padding overlying *a bottom portion of said palmer side panel and positioned to overlie* at least the distal halves of an index finger *metacarpal* and a long finger metacarpal[s] excluding the metacarpalphalangeal joints of said index finger and said long finger.

2. The glove of claim 1 further including a thumb A2 pulley padding disposed along said thumb stall at a location adapted to be over said thumb proximal phalanx between said metacarpalphalangeal joint and said interphalangeal joint.

3. The glove of claim 1 including proximal phalanx padding over at least the proximal phalanx of said index finger between the metacarpalphalangeal joint and the center axis of rotation of the *proximal* interphalangeal joint.

4. The glove of claim 3 further including middle phalanx padding covering at least the middle phalanx of said index finger above the proximal interphalangeal joint and below the center axis of rotation of the distal interphalangeal joint.

5. The glove of claim 1 including a thumb metacarpal pad overlying the thumb metacarpal between the center axis of rotation of the metacarpalphalangeal joint and the carpometacarpal joint.

[6. A glove comprising:

a palmar side panel and a dorsal side panel secured along each panel's outer periphery with an opening therein to receive a human hand, said dorsal side panel being sized to cover a back of said hand and in conjunction with said palmar side panel providing a thumb stall and a plurality of finger stalls for receiving a thumb and fingers of a human hand;

a palmar protective padding overlying at least the distal halves of an index finger and a long finger metacarpal excluding the metacarpal joints of said index finger and said long finger.]

7. [The glove of claim 6 further including] *A glove constructed to fit a hand of pre-determined size for protecting selected anatomical portions thereof, comprising:*

*a palmar side panel and a dorsal side panel secured along each panel's outer periphery with an opening therein to receive said hand, said dorsal side panel being sized to cover a back of said hand and in conjunction with said palmar side panel providing a thumb stall and a plurality of finger stalls for receiving a thumb and fingers of said hand;*

*a palmar protective padding disposed along a bottom portion of said palmar side panel and positioned to overlie at least the distal halves of an index finger metacarpal and a long finger metacarpal;*

*said glove palmar side panel being free of any padding covering the metacarpalphalangeal joints of said index finger and said long finger;* a thumb A2 pulley padding disposed along said thumb stall at a location adapted to be over [said] *a* thumb proximal phalanx between [said] *a* metacarpalphalangeal joint and [said] *an* interphalangeal joint *of said thumb.*

[8. The glove of claim 6 including proximal phalanx padding over at least the proximal phalanx of said index finger between the metacarpalphalangeal joint and the center axis of rotation of the interphalangeal joint.]

[9. The glove of claim 8 further including middle phalanx padding covering at least the middle phalanx of said index finger above the proximal interphalangeal joint and below the center axis of rotation of the distal interphalangeal joint.]

[10. The glove of claim 9 including a thumb metacarpal pad overlying the thumb metacarpal between the center axis of rotation of the metacarpalphalangeal joint and the carpometacarpal joint.]

*11. The glove of claim 7 including a proximal phalanx padding fixed to one of said plurality of finger stalls, said padding positioned over at least a proximal phalanx of said index finger between the metacarpalphalangeal joint and a center axis of rotation of a proximal interphalangeal joint of said index finger.*

*12. The glove of claim 11 further including a middle phalanx padding fixed to said one of said plurality of finger stalls, said middle phalanx padding covering at least a middle phalanx of said index finger above the proximal interphalangeal joint and below the center axis of rotation of a distal interphalangeal joint.*

* * * * *